United States Patent
Pyun

(10) Patent No.: US 11,795,248 B2
(45) Date of Patent: Oct. 24, 2023

(54) COPOLYMERIZATION OF ELEMENTAL SULFUR AND EPOXY FUNCTIONAL STYRENICS

(71) Applicant: ARIZONA BOARD OF REGENTS ON BEHALF OF THE UNIVERSITY OF ARIZONA, Tucson, AZ (US)

(72) Inventor: Dong-Chul Pyun, Tucson, AZ (US)

(73) Assignee: ARIZONA BOARD OF REGENTS ON BEHALF OF THE UNIVERSITY OF ARIZONA, Tucson, AZ (US)

(*) Notice: Subject to any disclaimer, the term of this patent is extended or adjusted under 35 U.S.C. 154(b) by 391 days.

(21) Appl. No.: 17/156,238

(22) Filed: Jan. 22, 2021

(65) Prior Publication Data

US 2021/0238352 A1 Aug. 5, 2021

Related U.S. Application Data

(63) Continuation-in-part of application No. PCT/US2019/054368, filed on Oct. 2, 2019, which is
(Continued)

(51) Int. Cl.
 *C08F 212/14* (2006.01)
 *C08G 75/02* (2016.01)

(52) U.S. Cl.
 CPC .......... *C08F 212/30* (2020.02); *C08F 212/22* (2020.02); *C08F 212/26* (2020.02); *C08G 75/02* (2013.01)

(58) Field of Classification Search
 CPC .... C08F 212/26; C08F 212/30; C08G 18/585; C08G 75/14; C08G 75/16
 See application file for complete search history.

(56) References Cited

U.S. PATENT DOCUMENTS

| 2,779,761 A | 1/1957 | Kibler |
| 2,989,513 A | 6/1961 | Hendry et al. |

(Continued)

FOREIGN PATENT DOCUMENTS

| CN | 104713968 A1 | 6/2015 |
| EP | 0806451 A1 | 11/1997 |

(Continued)

OTHER PUBLICATIONS

Chung, W.J. et al., "Elemental Sulfur as a Reactive Medium for Gold Nanoparticles and Nanocomposite Materials", Angewandte Chemie International Edition, 2011, 50, 11409-11412.
(Continued)

*Primary Examiner* — Amanda C. Walke
(74) *Attorney, Agent, or Firm* — NGUYEN TARBET LLC

(57) ABSTRACT

Sulfur copolymers and methods of synthesizing said sulfur copolymers are described herein. Sulfur monomers copolymerize with epoxide or vinylic moieties the epoxy-functionalized styrenic comonomers to form a crosslinked network of the sulfur copolymer. Sulfur copolymers having high sulfur content are used as raw materials in 3D printing. Chalcogenide-based copolymers can utilize selenium to provide for the optical properties. Using an inverse vulcanization method, chalcogenic sulfur copolymers are used to prepare chemically stable polymer plastic materials with tunable optical and thermochemical properties. Optical substrates, such as films, waveguides, and molded (nano-, micro-) objects and lenses, are constructed from sulfur copolymers via 3D printing and are substantially transparent in the visible and infrared spectrum.

18 Claims, 9 Drawing Sheets
(5 of 9 Drawing Sheet(s) Filed in Color)

Related U.S. Application Data a continuation-in-part of application No. 15/857,273, filed on Dec. 28, 2017, now Pat. No. 10,920,020, and a continuation-in-part of application No. 15/839,344, filed on Dec. 12, 2017, now abandoned, said application No. 15/857,273 is a continuation-in-part of application No. 15/287,118, filed on Oct. 6, 2016, now Pat. No. 10,833,330, and a continuation-in-part of application No. PCT/US2016/042057, filed on Jul. 13, 2016, said application No. 15/839,344 is a continuation-in-part of application No. PCT/US2016/042057, filed on Jul. 13, 2016, said application No. 15/287,118 is a continuation-in-part of application No. 14/622,429, filed on Feb. 13, 2015, now Pat. No. 9,567,439, which is a continuation-in-part of application No. 14/237,659, filed as application No. PCT/US2012/050602 on Aug. 13, 2012, now Pat. No. 9,306,218.

(60) Provisional application No. 62/740,372, filed on Oct. 2, 2018, provisional application No. 62/440,576, filed on Dec. 30, 2016, provisional application No. 62/433,050, filed on Dec. 12, 2016, provisional application No. 62/329,402, filed on Apr. 29, 2016, provisional application No. 62/313,010, filed on Mar. 24, 2016, provisional application No. 62/306,865, filed on Mar. 11, 2016, provisional application No. 62/212,188, filed on Aug. 31, 2015, provisional application No. 62/210,170, filed on Aug. 26, 2015, provisional application No. 62/203,525, filed on Aug. 11, 2015, provisional application No. 62/191,760, filed on Jul. 13, 2015, provisional application No. 62/039,561, filed on Aug. 20, 2014, provisional application No. 62/039,588, filed on Aug. 20, 2014, provisional application No. 62/017,750, filed on Jun. 26, 2014, provisional application No. 61/940,102, filed on Feb. 14, 2014, provisional application No. 61/685,847, filed on Mar. 26, 2012, provisional application No. 61/574,957, filed on Aug. 12, 2011, provisional application No. 61/574,903, filed on Aug. 11, 2011.

(56) References Cited

U.S. PATENT DOCUMENTS

| | | |
|---|---|---|
| 3,251,797 A | 5/1966 | Pugh et al. |
| 3,290,266 A | 12/1966 | Barnes et al. |
| 3,542,701 A | 11/1970 | van Raamsdonk |
| 3,544,492 A | 12/1970 | Taylor et al. |
| 3,563,962 A | 2/1971 | Mirviss |
| 3,767,613 A | 10/1973 | Dix et al. |
| 3,892,686 A | 7/1975 | Woo |
| 4,000,347 A | 12/1976 | Ranney et al. |
| 4,094,751 A | 6/1978 | Nozik |
| 4,238,585 A | 12/1980 | Bertozzi |
| 4,346,191 A | 8/1982 | Blount |
| 4,382,846 A | 5/1983 | Gratzel et al. |
| 4,568,435 A | 2/1986 | Shelnutt |
| 4,606,798 A | 8/1986 | Sasse et al. |
| 4,671,896 A | 6/1987 | Hasegawa et al. |
| 4,739,036 A | 4/1988 | Colvin et al. |
| 4,740,559 A | 4/1988 | Johansson et al. |
| 4,749,347 A | 6/1988 | Valavaara |
| 4,752,507 A | 6/1988 | Hendry et al. |
| 4,833,048 A | 5/1989 | DeJonghe et al. |
| 5,115,060 A | 5/1992 | Grey |
| 5,121,329 A | 6/1992 | Crump |
| 5,279,910 A | 1/1994 | Sasaki et al. |
| 5,371,176 A | 6/1994 | Bezwada et al. |
| 5,362,493 A | 11/1994 | Skotheim et al. |
| 5,811,470 A | 9/1998 | Prindle et al. |
| 5,929,202 A | 7/1999 | Arita et al. |
| 6,011,094 A | 1/2000 | Planche et al. |
| 6,072,026 A | 6/2000 | Kawase et al. |
| 6,111,030 A | 8/2000 | Hailman et al. |
| 6,180,691 B1 * | 1/2001 | Cheng .......... C09D 11/30 524/517 |
| 9,306,218 B2 | 4/2016 | Pyun et al. |
| 9,321,871 B2 * | 4/2016 | Schultz .......... C08F 2/18 |
| 9,463,597 B2 | 10/2016 | Van De Vrie et al. |
| 9,567,439 B1 | 2/2017 | Pyun et al. |
| 2001/0047043 A1 | 11/2001 | Okoroafor et al. |
| 2001/0047403 A1 | 11/2001 | Okoroafor et al. |
| 2002/0039680 A1 | 4/2002 | Hwang et al. |
| 2003/0060567 A1 | 3/2003 | Faderl et al. |
| 2007/0010600 A1 | 1/2007 | Goodman et al. |
| 2007/0253772 A1 | 11/2007 | Kubo et al. |
| 2008/0038645 A1 | 2/2008 | Kolosnitsyn et al. |
| 2010/0029163 A1 | 2/2010 | Ogle et al. |
| 2011/0245360 A1 | 10/2011 | Hahn et al. |
| 2011/0263755 A1 | 10/2011 | Mohamed et al. |
| 2012/0264837 A1 | 10/2012 | Eberstaller et al. |
| 2013/0040197 A1 | 2/2013 | Liu et al. |
| 2013/0064904 A1 | 3/2013 | Gojon-Romanillos et al. |
| 2014/0110881 A1 | 4/2014 | Keledjian et al. |
| 2014/0199592 A1 | 7/2014 | Pyun et al. |
| 2015/0203638 A1 | 7/2015 | Sivanandan et al. |
| 2018/0079865 A1 | 3/2018 | Pyun |
| 2018/0100037 A1 | 4/2018 | Pyun |
| 2018/0105649 A1 | 4/2018 | Pyun et al. |
| 2018/0186967 A1 | 7/2018 | Pyun |
| 2018/0208686 A1 | 7/2018 | Pyun et al. |
| 2018/0264688 A1 | 9/2018 | Jaker et al. |
| 2019/0338076 A1 | 11/2019 | Pyun et al. |

FOREIGN PATENT DOCUMENTS

| | | |
|---|---|---|
| EP | 1882713 A1 | 1/2008 |
| EP | 2093605 A1 | 8/2009 |
| EP | 2896644 A1 | 7/2015 |
| GB | 1203577 A | 8/1970 |
| GB | 1516554 A | 7/1978 |
| WO | WO1995018652 A1 | 7/1995 |
| WO | 2007076067 A3 | 7/2007 |
| WO | WO2009158385 A | 12/2009 |
| WO | WO2013023216 A1 | 2/2013 |
| WO | WO2013155038 A1 | 10/2013 |
| WO | WO2014052255 A1 | 4/2014 |
| WO | WO2014179100 A1 | 11/2014 |
| WO | WO2015123552 A1 | 8/2015 |
| WO | 2017011533 A1 | 1/2017 |

OTHER PUBLICATIONS

Colquhoun, Howard M., "Materials that heal themselves", Nature Chemistry, Jun. 2012, vol. 4, 435-436.

Yang, Ying and Urban Marek W., "Self-healing polymeric materials", Chem. Soc. Rev., 2013, 42, 7446-7467.

Hasegawa, Urara and Van Der Vlies, André J., "Design and Synthesis of Polymeric Hydrogen Sulfide Donors", Bioconjugate Chemistry, 2014, 25 (7), 1290-1300.

Foster, Jeffrey C., et al., "S-Aroylthiooximes: A Facile Route to Hydrogen Sulfide Releasing Compounds with Structure-Dependent Release Kinetics", Organic Letters. 2014, 16, 1558-1561.

Wurthner, F., "Perylene bisimide dyes as versatile building blocks for functional supramolecular architectures", Chem. Commun. 2004, 1564-1579.

Chung, W.-. et al., "The use of elemental sulfur as an alternative feedstock for polymeric materials", Nature Chemistry 2013, vol. 5, 518-524.

Simmonds, A.G. et al., "Inverse Vulcanization of Elemental Sulfur to Prepare Polymeric Electrode Materials for Li—S Batteries", ACS Macro Lett. 2014, 3, 229-232.

Liu, G. et al., "α-Sulfur Crystals as a Visible-Light-Active Photocatalyst", J. Am. Chem. Soc. 2012, 134, 9070-9073.

(56) References Cited

OTHER PUBLICATIONS

Asmus, K.-D., "Pulse Radiolysis Methodology", Methods in Enzymology 1984, 105, 167-178.
Nishide, et al., "Toward Flexible Batteries", (2008) Science, vol. 319, 737-738.
Nishide, et al., "Emerging N-Type Redox-Active Radical Polymer for a Totally Organic Polymer-Based Rechargeable Battery", (2009), Adv Mater, 21, 1627-1630.
Tarascon, et al., "Key challenges in future Li-battery research", (2010) Phil Trans R Soc A, 368, 3227.
Rotinjanz, et al. (1908) Z. Physik Chem, 62, 609.
Bacon, et al., "The Viscosity of Sulfur", (1943) J Am Chem Soc, 65, 639.
Eyring, et al., "The Properties of Liquid Sulfur", (1943) J Am Chem 65, 648.
Tobolsky, A. V. et al., "Equilibrium Polymerization of Sulfur", Am. Chem. Soc. 1959, 81, 780.
Penczek, et al. (1974) Nature, 273, 738.
Nazar et al., "A highly ordered nanostructured carbon-sulphur cathode for lithium-sulphur batteries", Nature Mater. 2009, 8, 500-506.
Scrosati, et al., "A High-Performance Polymer Tin Sulfur Lithium Ion Battery", Angew. Chem. Int. Ed. 2010, 49, 2371-2374.
Chen, et al., J. Phys. Chem. C2011, 115, 6057-6063.
Yang, et al., ACS Nano 2011, 5, 9187-9193.
Bartlett, et al., (1956) J Am Chem Soc, 78, 3710.
McGrath, et al. (2006) Polymer, 47, 4042.
Ueda et al., (2009) J Mater Chem, 19, 8907.
Trofimov, et al. (2002) "Sulfur-rich copolymers of sulfur with 5-vinylbicyclo hept-2-ene and tricyclo deca-3,8-diene as prospective cathode materials for lithium cells," Sufur Letters, 25: 219-227.
Ning, et al., (2004) "Novel cathode material based on chloropolystyrene," PMSE Preprints, American Chemical Society 90: 396-397.
Wang, et al., Nano Lett. 2011, 11, 2644-2647.
Zheng, et al., Nano Lett. 2011, 11, 4462-1467.
Li, et al., Proc. Nail. Acad. Sci. U.S.A. 2013, 110, 7148-7153.
Zheng, et al., Nano Lett. 2013, 13, 1265-1270.
Zhou, et al., ACS Nano 2013, 7, 8801-8808.
Seh, et al., Nat. Commun. 2013, 4.
Li, et al., Nano Lett. 2013, 13, 5534.
Liu, et al., Nat. Nanolech. 2014, 9, 187.
Pyun, J. Angew. Chem Int. Ed., 2011, 50, 11409-11412.
Woo et al. Nature Chemistry. Jun. 2013. vol. 5, pp. 518-524. Published online Apr. 14, 2013.
Suzuki et al. Hydrogen generation using water-insoluble polymer-bound ruthenium(ii) Complexes. Chemical Communications, 1997, Issue 2, p. 227.
Suzuki et al. Photoinduced hydrogen generation from water-insoluble polymer photosensitizer films. Polymer, 1998, vol. 39, Issue 8, p. 1539-1543.
Suzuki et al. Photoinduced hydrogen generation using polymer photosensitizers. Macromolecular Chemistry and Physics, Jun. 1998, vol. 199, Issue 6.
Wang et al. A metal-free polymeric photocatalyst for hydrogen production from water under visible light. Nature Materials 8, 76-80 (2009).
Goldsmith et al. Discovery and High-Throughput Screening of Heteroleptic Iridium Complexes for Photoinduced Hydrogen Production. J. Am. Chem. Soc., 2005, 127 (20), pp. 7502-7510.
Tinker et al. Visible Light Induced Catalytic Water Reduction without an Electron Relay. Chemistry—A European Journal, 2007, vol. 13, Issue 31, pp. 8726-8732.
Happ et al. Towards Hydrogen Evolution Initiated by LED Light: 2-(1 H-1,2,3-Triazol-4-yl)pyridine containing Polymers as Photocatalyst. Macromolecular Rapid Communications, Apr. 2015, vol. 36, Issue 7, 671-677.
Aguirre De Carcer et al. Active-Site Models for Iron Hydrogenases: Reduction Chemistry of Dinuclear Iron Complexes. Inorg. Chem., 2006, 45 (20), pp. 8000-8002.
Alongia et al. Caseins and hydrophobins as novel green flame retardants for cotton fabrics. Polymer Degradation and Stability vol. 99, Jan. 2014, pp. 111-117.
Beom-Young Ryu and Todd Emrick. Thermally Induced Structural Transformation of Bisphenol-1,2,3-triazole Polymers: Smart, Self-Extinguishing Materials. Angew. Chem. Int. Ed. 2010, 49, 9644-9647.
Laufer et al. Clay-Chitosan Nanobrick Walls: Completely Renewable Gas Barrier and Flame-Retardant Nanocoatings. ACS Appl. Mater. Interfaces 2012, 4, 1643-1649.
Laufer et al. Exceptionally Flame Retardant Sulfur-Based Multilayer Nanocoating for Polyurethane Prepared from Aqueous Polyelectrolyte Solutions. ACS Macro Lett., 2013, 2 (5), pp. 361-365.
Li et al. Intumescent All-Polymer Multilayer Nanocoating Capable of Extinguishing Flame on Fabric. Adv. Mater. 2011, 23, 3926-3931.
Ding et al. Photoelectrocatalytic Water Splitting: Significance of Cocatalysts, Electrolyte, and Interfaces. ACS Catal. 2017, 7, 675-688.
Swenson, M. Synthesis and Characterization of [Fe Fe) Hydrogenase Mimics. The University of Arizona, 2013, pp. 1-157 online), [retrieved on Jan. 19, 2018). Retrieved from the Internet <http://arizona.openrepository.com/arizona/handle/1 0150/294029>.

\* cited by examiner

COPOLYMERIZATION OF ELEMENTAL SULFUR AND EPOXY FUNCTIONAL STYRENICS

CROSS-REFERENCES TO RELATED APPLICATIONS

This application is a continuation-in-part and claims benefit of U.S. patent application Ser. No. 15/839,344, filed Dec. 12, 2017, which is a non-provisional and claims benefit of U.S. Provisional Patent Application No. 62/433,050 filed Dec. 12, 2016, the specification(s) of which is/are incorporated herein in their entirety by reference.

This application is a continuation-in-part and claims benefit of U.S. patent application Ser. No. 15/857,273, filed Dec. 28, 2017, which is a non-provisional and claims benefit of U.S. Provisional Application No. 62/440,576 filed Dec. 30, 2016, the specification(s) of which is/are incorporated herein in their entirety by reference.

This application also claims benefit of PCT/US19/54368, filed Oct. 2, 2019, which claims benefit of U.S. Provisional Application No. 62/740,372, filed Oct. 2, 2018, the specification(s) of which is/are incorporated herein in their entirety by reference.

U.S. patent application Ser. No. 15/839,344 is also a continuation-in-part and claims benefit of PCT Patent Application No. PCT/US16/42057 filed Jul. 13, 2016, the specification(s) of which is/are incorporated herein in their entirety by reference.

U.S. patent application Ser. No. 15/857,273 is also a continuation-in-part and claims benefit of PCT Application No. PCT/US16/42057 filed Jul. 13, 2016, the specification(s) of which is/are incorporated herein in their entirety by reference.

PCT Application No. PCT/US16/42057 filed Jul. 13, 2016 claims benefit of U.S. Provisional Application No. 62/191,760 filed Jul. 13, 2015, U.S. Provisional Application No. 62/203,525 filed Aug. 11, 2015, U.S. Provisional Application No. 62/210,170 filed Aug. 26, 2015, U.S. Provisional Application No. 62/212,188 filed Aug. 31, 2015, U.S. Provisional Application No. 62/306,865 filed Mar. 11, 2016, U.S. Provisional Application No. 62/313,010 filed Mar. 24, 2016, and U.S. Provisional Application No. 62/329,402 filed Apr. 29, 2016, the specification(s) of which is/are incorporated herein in their entirety by reference.

U.S. patent application Ser. No. 15/857,273 is also a continuation-in-part and claims benefit of U.S. patent application Ser. No. 15/287,118 filed Oct. 6, 2016, now U.S. Ser. No. 10/833,330, which is a continuation and claims benefit of U.S. patent application Ser. No. 14/622,429 filed Feb. 13, 2015, now U.S. Pat. No. 9,567,439, which claims priority to U.S. Provisional Application No. 62/039,561 filed Aug. 20, 2014, U.S. Provisional Application No. 62/039,588 filed Aug. 20, 2014. U.S. Provisional Application No. 62/017,750 filed Jun. 26, 2014, and U.S. Provisional Application No. 61/940,102 filed Feb. 14, 2014, the specification(s) of which is/are incorporated herein in their entirety by reference.

Furthermore, U.S. patent application Ser. No. 14/622,429, now U.S. Pat. No. 9,567,439, is a continuation-in-part and claims benefit of U.S. patent application Ser. No. 14/237,659 filed Mar. 11, 2014, now U.S. Pat. No. 9,306,218, which is a 371 of PCT Application No. PCT/US12/50602 filed Aug. 13, 2012, which claims benefit of U.S. Provisional Application No. 61/685,847 filed Mar. 26, 2012, U.S. Provisional Application No. 61/574,957 filed Aug. 12, 2011, and U.S. Provisional Application No. 61/574,903 filed Aug. 11, 2011, the specification(s) of which is/are incorporated herein in their entirety by reference.

STATEMENT REGARDING FEDERALLY SPONSORED RESEARCH OR DEVELOPMENT

This invention was made with government support under Grant No. 1305773 and Grant No. 1607971, awarded by NSF. The government has certain rights in the invention.

FIELD OF THE INVENTION

In one aspect, the present invention relates to compositions and methods of synthesizing sulfur copolymers from elemental sulfur and epoxy functional styrenics. In particular, the sulfur copolymers described herein can have improved thermomechanical properties.

The present invention also relates to the fabrication of optical components and devices via 3D-printing of ultra-high refractive index copolymers prepared from sulfur-, selenium-, and chalcogenide-containing monomers and organic comonomers.

In further aspects, the present invention relates to the preparation of optical waveguides using chalcogenide hybrid inorganic/organic polymers.

BACKGROUND OF THE INVENTION

An incredible abundance of elemental sulfur, nearly 7-million tons is generated as a waste byproduct from hydrodesulfurization of crude petroleum feedstocks, which converts alkanethiols and other (organo) sulfur compounds into $S_8$. Before the invention of the inverse vulcanization process, there were only a limited number of synthetic methods available to utilize and modify elemental sulfur. Current industrial utilization of elemental sulfur is centered around sulfuric acid, agrochemicals, and vulcanization of rubber. For example, elemental sulfur is used primarily for sulfuric acid and ammonium phosphate fertilizers, where the rest of the excess sulfur is stored as megaton-sized, above ground sulfur towers.

Although sulfur feedstocks are plentiful, sulfur is a difficult material to process. In its original form, elemental sulfur consists of a cyclic molecule having the chemical formulation $S_8$. Elemental sulfur is a brittle, intractable, crystalline solid having poor solid state mechanical properties, poor solution processing characteristics, and there are only a limited number of synthetic methods available to utilize and modify elemental sulfur.

The inventors have previously developed a facile, one-step polymerization termed "inverse vulcanization" to prepare sulfur copolymers with a very high content of S—S bonds in the copolymer backbone ranging from 50-90 wt % sulfur that exhibited both high refractive index (n=1.9 to 1.7 from 600-1500 nm) and high IR transparency, in which further details can be found in co-owned U.S. Pat. Nos. 9,567,439 and 9,306,218, the specifications of which are incorporated herein in their entirety by reference.

Previous sulfur copolymers that have been synthesized, such as those described in U.S. Pat. Nos. 9,306,218 and 9,567,439 of Pyun, the contents of which are incorporated herein by reference in their entirety, exhibit poor thermomechanical properties despite having outstanding electrochemical and optical properties. The poor thermomechanical properties of these materials hold back the translation of these materials to the polymer industry. Hence, there is a need for sulfur copolymers that have improved thermomechanical properties.

The present invention features a novel and unexpected polymerization-crosslinking reaction that also creates new sulfur plastics that retain the useful electrochemical/optical properties of earlier sulfur plastics, coupled with improved thermomechanical properties.

Development of polymeric materials for infrared (IR) optical applications has not been achieved due to challenges in designing systems with sufficiently high refractive index (n) and transparency in the IR spectral regime. High refractive index polymers (HRIPs) are largely found in optical oriented devices, such as lenses. These HRIPs offer several significant advancements to older and current technologies in this field, such as lower densities, greater strengths, and overall increased performance. A higher "n" value indicates greater resistance to damage and breakage. Also, high-index lenses become lighter with an increasing n– value. For example, HRIPs allow for the production of thin lenses even for high prescriptions generally ranging from n=1.5 to n=1.8. Further, an increasing n– value would allow for lighter, more efficient frames (scopes) for these lenses. To date, organic plastics exhibit poor performance in the optical window of 1 to 10 µm due to strong IR absorption from the plastic material.

IR optical technology has numerous potential applications in the civil, medical, and military areas, with chalcogenide glasses and inorganic semiconductors (e.g., Ge, Si) being widely used as materials for device components due to their high refractive index (n~2.0-4.0) and low losses from 1-10 µm. Other examples of glass materials currently in use are InSb, InGaAs, HgCdTe. ArSe, and ArS. While such materials are well suited for these applications, they are more expensive, toxic, and difficult to process as compared to organic or organic/inorganic hybrid polymeric materials.

Sulfur has a high refractive index, with n≥1.7 through the visible and IR spectra, which is significantly higher than all organic plastic materials. Moreover, the S—S bonds are largely IR inactive in this same optical window. Hence, the use of elemental sulfur as the chemical feedstock for these materials is desirable due to both the low cost of S8 and favorable optical properties. However, since sulfur is difficult to process into films and molded objects, and previous synthetic methods have limited abilities to incorporate sulfur and create polymers with a high content of S—S bonds, there remains a need to improve the optical properties of said polymers to enable the development of materials for mid-IR applications.

3D printing, also known as additive layer manufacturing (ALM), typically comprises depositing, curing, fusing, or otherwise forming a material into sequential cross-sectional layers of the 3D object. Unlike milling that removes material to produce an object, ALM builds a solid object from a series of layers of material with each layer printed and formed on top of the previous layer. Examples of 3D printing techniques are generally disclosed in U.S. Pat. Nos. 4,749,347, 5,121,329, and 9,463,597, among others, which are incorporated by reference herein in their entirety.

Briefly, in the 3D printing process, a 3D printing device may comprise a dispenser, such as a dispenser head, that is capable of being moved in the x-, y-, and z-axes relative to a print pad. The print material is generally deposited out of the dispenser in layers in the x- and y-axes to form cross-sectional layers that are stacked along the z-axis to form the 3D object. In some embodiments, the print material may be in the form of a filament, liquid, gel, or powder form. The 3D printing device may be computer driven in a process utilizing computer aided design (CAD) or other computer software to generate drive signals for controlled movement of the dispenser and other components. Depending on the process that is used, many different types of materials can be used to form the patterned layers of the final product including photopolymers, thermopolymers, plastics and metal powders. Current inorganic transmitting materials for IR imaging is extremely difficult to 3D print since it requires high temperatures to process said materials. Hence, there exists a need for materials that may be used for IR imaging and that are easily processable via 3D printing.

Currently, chalcogenide glasses are the primary material of choice for IR optics in the 3-5 micron range since all organic polymers strongly absorb in the IR optical regime. The present invention features chalcogenide-based copolymers that exhibit superior processing advantages over chalcogenide glasses since the chalcogenide-based copolymers can be solution or melt processed at relatively lower temperatures, which would make said copolymers compatible for 3D printing.

Integrated photonics is poised to dominate the photonics industry thanks to a mature complementary metal oxide semiconductor (CMOS) integrated circuit (IC) manufacturing platform, namely, silicon photonics. Despite growing on-chip functionality and integration density, efficient, low cost, scalable and high throughput optical interfacing of photonic ICs (PICs) has remained a challenge. While optical fibers have dominated this area, they also have become a bottleneck due to their low coupling efficiency, lack of scalability, and extremely low misalignment tolerance. So, while chip manufacturing costs constantly decrease, the use of high-precision packaging tools and the subsequent reduction in throughput impose significant additional costs. Therefore, lack of an economical optical packaging solution for chip-to-chip and chip-to-board connectivity remains a barrier to widespread deployment of silicon photonics, which can address applications such as telecommunications and burgeoning data center photonics, as well as Internet of Things (IoT) sensors, with sensors for health, manufacturing, and autonomous vehicles critical for full realization of modern community concepts such as smart cities.

One aspect of the invention encompasses methods for making optical waveguides with high refractive index (n, or RI), broadband infrared transparent chalcogenide hybrid inorganic/organic polymers (CHIPs), which address both conventional optical communications applications at wavelengths such as 1550 nm and 1310 nm and emerging applications in the mid-wave infrared (MWIR) from 3 microns to 5 microns. Very few material choices exist for integrated photonics in the MWIR region of the optical spectrum, and no low-cost polymer system is currently viable. In some cases the CHIPs waveguides may be used as optical interconnects in conjunction with optical fibers and silicon PICs, acting to efficiently deliver light from the optical fiber to the silicon PIC and vice versa. In the MWIR, significant opportunities exist for stand-alone devices such as integrated, compact and portable MWIR spectrometers, which could be used for applications such as human breath analysis, toxic substance detection and carbon dioxide monitoring among many others, since the MWIR region has signature IR vibrations for many molecules.

BRIEF SUMMARY OF THE INVENTION

It is an objective of the present invention to provide for sulfur copolymers that have crosslinked sulfur copolymer networks with useful electrochemical and optical properties and improved thermomechanical properties, and methods of making said sulfur copolymers. Embodiments of the invention are given in the dependent claims. Embodiments of the present invention can be freely combined with each other if they are not mutually exclusive.

The subject disclosure features the copolymerization elemental sulfur with epoxy-functional styrenic comonomers to prepare sulfur copolymers having improved thermomechanical properties. This approach is advantageous because the epoxy functional styrenic comonomers are readily accessible and offer an unexpected and novel polymerization mechanism to form cross-linked sulfur copolymers, which has not been previously observed nor utilized.

As known to one of ordinary skill in the art, epoxide groups do not typically react with sulfur radicals. For example, the crosslinking and polymerization of the epoxide groups typically require the addition of a photoinitiator/catalyst or base to promote these reactions. Hence, the inventors initially strived to make a sulfur copolymer that was a soluble, non-crosslinked polymer fluid carrying reactive epoxide side chain groups.

However, the inventors have surprisingly discovered a novel polymerization reaction in which rigid, crosslinked sulfur polymer networks were formed from a single heating step of liquid sulfur and epoxy functional styrenics, such as 4-vinylbenzyl glycidyl ether or 4-epoxystyrene (also named 2-(4-vinylphenyl)oxirane)). Direct copolymerization of liquid sulfur (via inverse vulcanization), or polysulfides like poly(styrene-random-sulfur) (via dynamic covalent polymerization) was unexpected. When heating liquid sulfur, reactive sulfur intermediates such as sulfur radicals and anions may be generated in the same medium. The liquid sulfur and inverse vulcanization process can proceed via reactivity of sulfur radicals generated from liquid sulfur undergoing thiol-ene addition to vinylic moieties. Oxiranes and epoxides can be ring-opened by neutral nucleophiles, or anionically by nucleophilic anions (e.g., alkoxides or thiolates which are sulfur anionic species). None of the presently known prior references or works has this unique inventive technical feature of the present invention.

Further still, sulfur copolymers, such as poly(sulfur-random-(1,3-diisopropenyl-benzene), can have low glass transition temperatures of around 0-30° C. as determined from Differential Scanning Calorimetry (DSC). As known to one of ordinary skill in the art, the glass transition temperature of a polymer is defined as the temperature of when the polymer goes from an amorphous rigid state to a more flexible state (i.e. rubbery), under ambient conditions. The novel sulfur copolymers of the present invention exhibit glass transition temperatures exceeding 50° C. as determined from DSC, which, in reality, may be significantly higher since DSC tends to underestimate these glass transition values. None of the presently known prior references or work has this unique inventive technical feature of the present invention.

The present invention features a novel and unexpected polymerization-crosslinking reaction that also creates new sulfur plastics that retain the useful electrochemical/optical properties of earlier sulfur plastics, coupled with improved thermomechanical properties.

Another objective of the present invention is to use the sulfur copolymers described herein to prepare optical waveguides. A key feature of the waveguides of the present invention is that the CHIPs materials have higher refractive indices than other known polymers. This allows creation of very compact waveguide structures such as arrayed waveguide gratings, microring resonators, and small radius of curvature waveguide bends.

Another key feature of the waveguides of the invention is that CHIPs materials are transparent at mid-infrared wavelength between 3.5 and 5.5 microns, and there a very few materials (notably germanium, chalcogenide glass and zinc selenide), that are transparent in this region.

In some embodiments the invention encompasses a method comprising directly photopatterning unstructured polymer thin films of CHIPs based on poly(sulfur-random-(1,3-diisopropenylbenzene) (abbreviated to poly(S-r-DIB) by exposure with ultraviolet radiation with any development, or solvent washing steps. By irradiation through various photomasks available through standard photography methods, arbitrary patterns may be directly photopatterned into thin films. Inventors also surprisingly discovered that a reduction in the refractive index in photoexposed regions on the order of $10^{-2}$ refractive index units, which enables direct fabrication of optical waveguide architectures and devices.

Another aspect of the invention is directed to a photoresponsive medium comprising one or more CHIPs. Without wishing to limit the invention to a particular theory, the CHIPs photoresponsive medium has the property of changing its refractive index upon the application of certain wavelengths of radiation, preferably in the ultraviolet between 350-400 nm, with the amount of refractive index change proportional to the duration of the illumination.

In some embodiments, the invention encompasses a method of preparing a photopatterned, unstructured polymer thin film, said method comprising photopatterning unstructured polymer thin films of one or more CHIPs based on poly(sulfur-random-(1,3-diisopropenylbenzene) (poly(S-r DIB) by exposure with ultraviolet radiation without any development, or solvent washing steps to obtain a refractive index contrast in the polymer.

This is the first discovery of photopatterning with CHIPs materials and is a useful technological advance for optical photonics using inexpensive, solution processable CHIPs materials.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The patent application or application file contains at least one drawing executed in color. Copies of this patent or patent application publication with color drawing(s) will be provided by the Office upon request and payment of the necessary fee.

The features and advantages of the present invention will become apparent from a consideration of the following detailed description presented in connection with the accompanying drawings in which.

Figure 6:
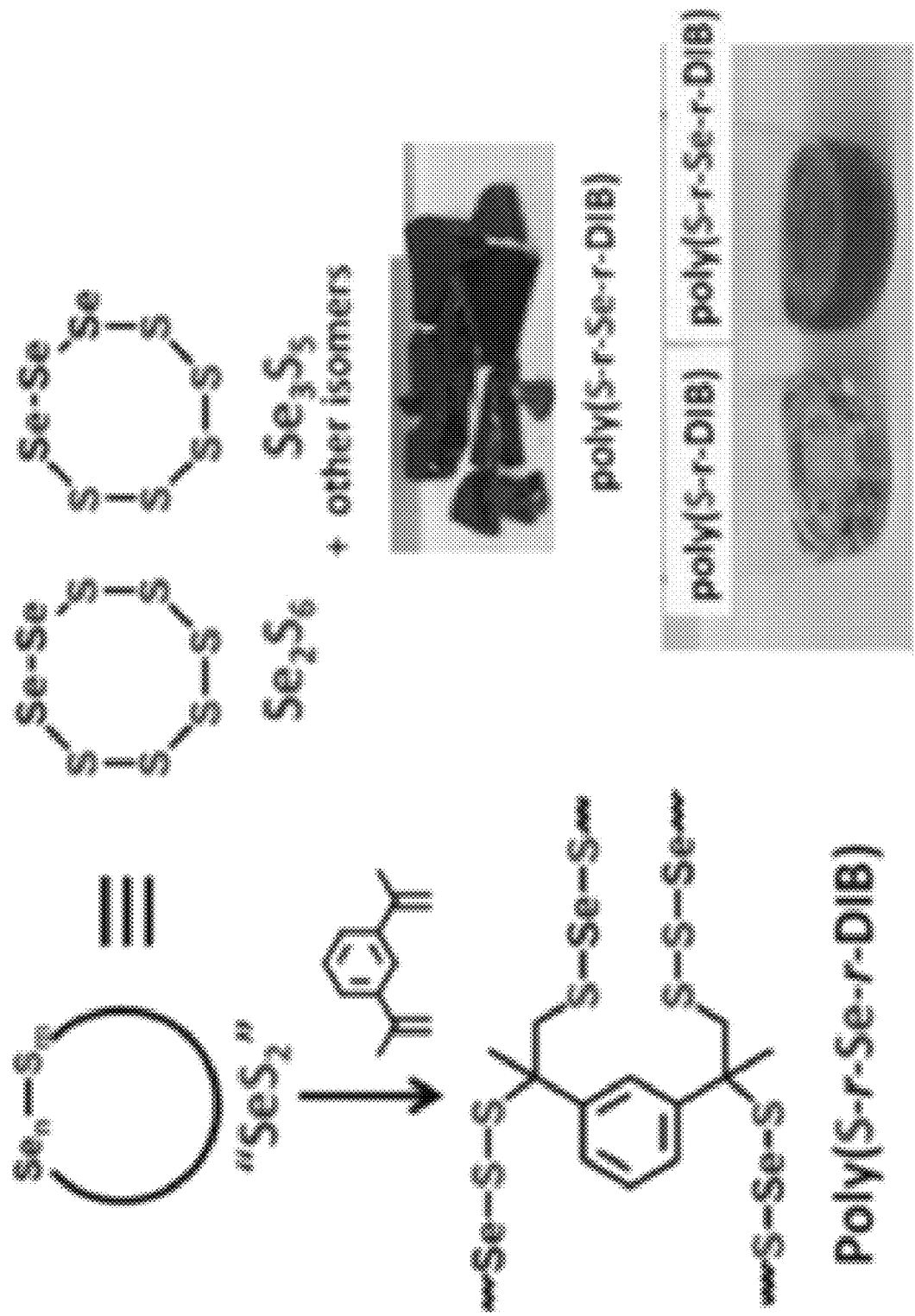

FIG. 6 shows an exemplary reaction schematic of cyclic selenium sulfides polymerizing with comonomers to form chalcogenide-based sulfur copolymers. In some embodiments, the cyclic selenium sulfides may comprise monomers according to the formula $Se_nS_m$, and isomers thereof. For example, the cyclic selenium sulfides may comprise mixtures of different isomers of $Se_2S_6$ and $Se_3S_5$.

Figure 7A:
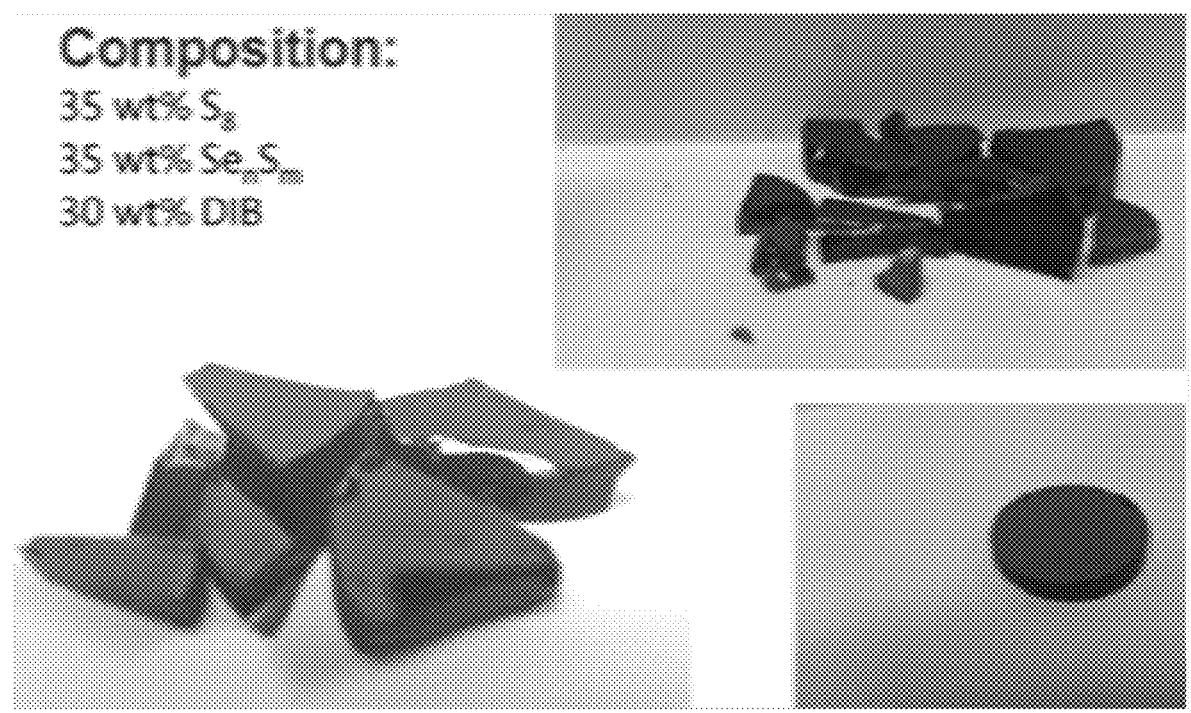

FIG. 7A shows an example of chalcogenide-based sulfur copolymer.

Figure 7B:
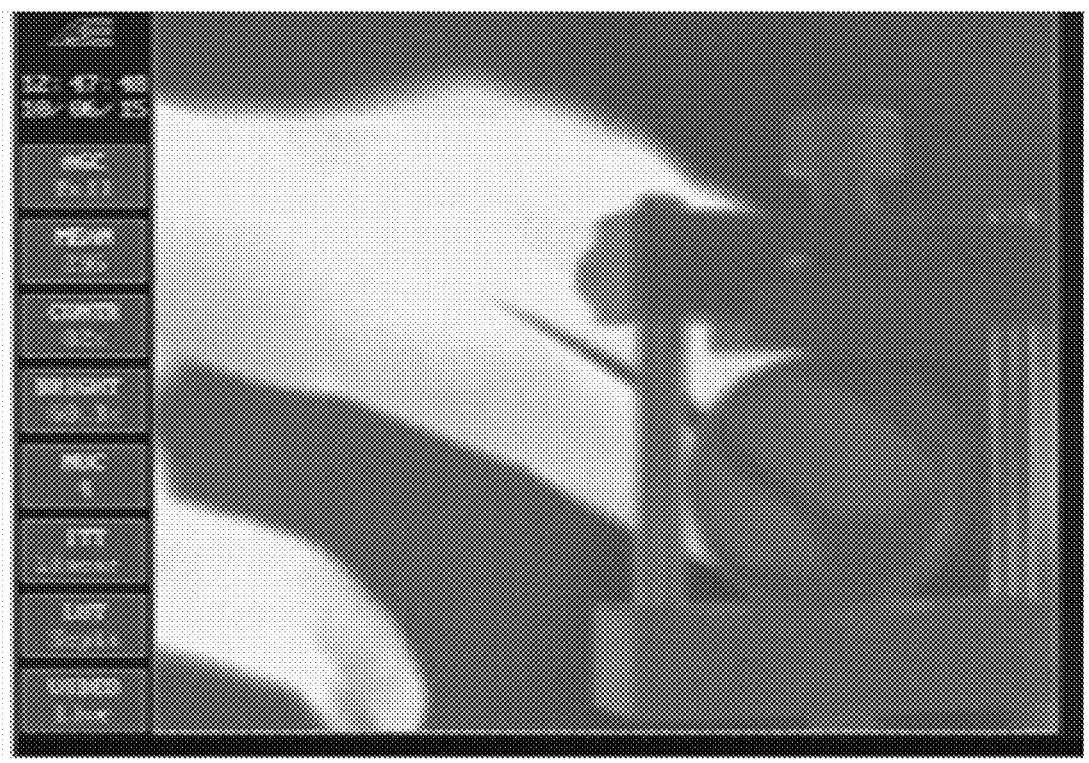

FIG. 7B depicts an IR imaging through an optical substrate containing a chalcogenide-based sulfur copolymer.

Figure 8:
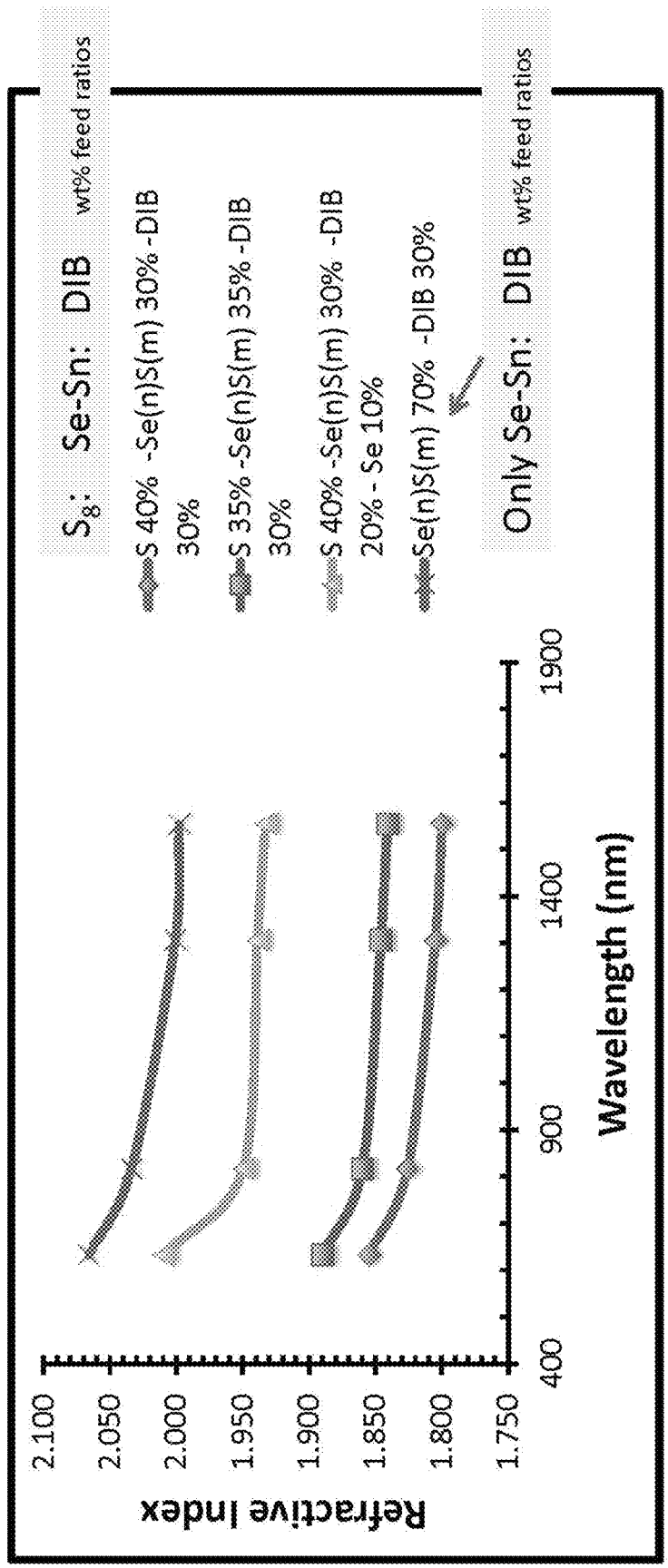

FIG. 8 shows a plot of refractive index vs. wavelength of chalcogenide-based sulfur copolymers having varying compositions.

Figure 9:
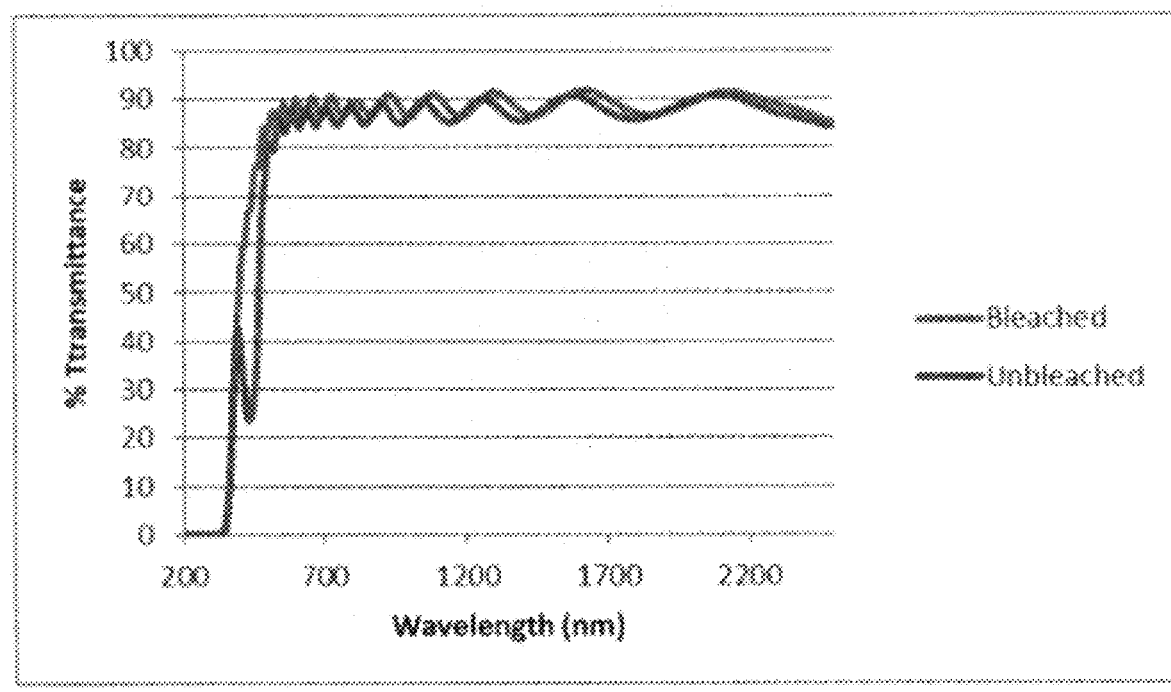

FIG. 9 shows UV Visible spectra of polymer thin films. One film is exposed to UV light and the other is not treated. The spectra show that there is a feature in the 500 nm region that disappears upon bleaching; the elimination of this feature, which is due to absorption, causes changes in the refractive index, that manifest themselves as shifts in the spectrum in the transparency region (i.e. >700 nm), where the oscillations are due to thin film interference.

Figure 10:
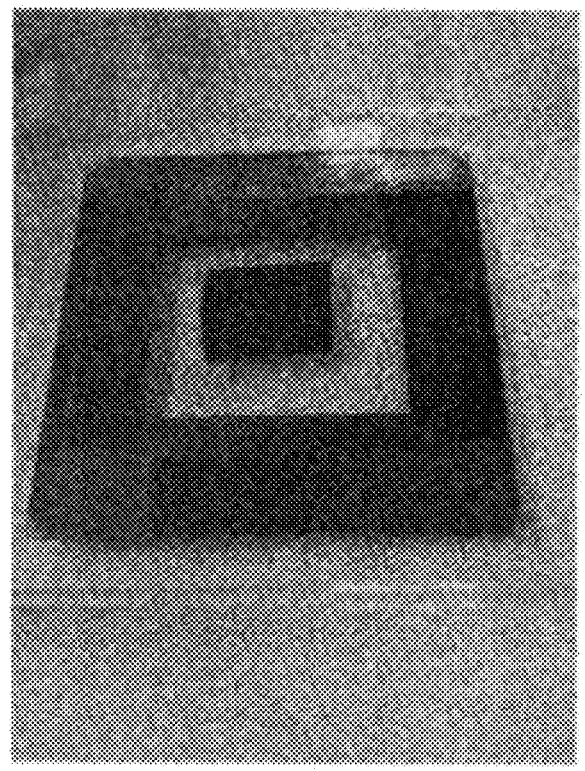

FIG. 10 shows one embodiment of the waveguide prepared from the sulfur copolymer described herein.

DETAILED DESCRIPTION OF THE INVENTION

As used herein, sulfur can be provided as elemental sulfur, for example, in powdered form. Under ambient conditions, elemental sulfur primarily exists in an eight-membered ring form ($S_8$) which melts at temperatures in the range of 120° C.-130° C. and undergoes an equilibrium ring-opening polymerization (ROP) of the $S_8$ monomer into a linear polysulfane with diradical chain ends. As the person of skill in the art will appreciate, while $S_8$ is generally the most stable, most accessible and cheapest feedstock, many other allotropes of sulfur can be used (such as other cyclic allotropes, derivable by melt-thermal processing of $S_8$). Any sulfur species that yield diradical or anionic polymerizing species when heated as described herein can be used in practicing the present invention.

As used herein, the term "sulfur polymer" generally refers to any polymer or copolymer that contains sulfur monomers. In some embodiments, the sulfur monomers may be derived from elemental sulfur ($S_8$). The term "sulfur polymer" may be used interchangeably with sulfur copolymer, sulfur polymer composition, or sulfur terpolymer, unless specified otherwise.

As used herein, the term "chalcogenide" refers to a compound containing one or more chalcogen elements. One of ordinary skill in the art will understand that the classical chalcogen elements are sulfur, selenium and tellurium. In accordance with the present invention, the use of chalcogenide also refers to compounds and/or polymers containing selenium.

As known to one of ordinary skill in the art, the term "isomer" refers to compounds having the same formula but differ in arrangement. For instance, isomers of cyclic selenium sulfides, such as $Se_2Se_8$ and $Se_3S_5$, can have different placements of the Se units in the ring (e.g., S—Se—Se—S or S—Se—S). Isomers of $Se_2S_6$ include 1,2-isomers, 1,3-isomers, 1,4-isomers, and 1,5-isomers, where the numbers refer to the position of the Se units in the eight-membered ring.

As used herein, an "elemental carbon material" is a material that is primarily formed as an allotrope of carbon, with a minor amount of chemical modification. For example, graphene, graphene oxide, graphite, carbon nanotubes, fullerenes, carbon black, carbon flakes and carbon fibers are examples of elemental carbon materials. As a general guideline for the person of skill in the art, an elemental carbon material can be dispersed in sulfur at temperatures high enough such that the sulfur is molten, but low enough that significant ring opening and polysulfide polymerization does not occur (e.g., at temperatures in the range of about 120° C. to about 160° C.). Higher loadings of elemental carbon materials in sulfur can be achieved by pre-dissolution of the sulfur and dispersion of the elemental carbon material into a suitable solvent (e.g., carbon disulfide) followed by removal of the solvent under reduced pressure to yield a blended composite powder. To induce curing of the dispersed carbon, or other nanoinclusions with the sulfur matrix, direct heating of the dispersion to above 160° C. but typically below 200° C. can afford a polymerized nanocomposite.

As used herein, the term "functional" in correlation with a polymer refers to functional polymers that have specified physical, chemical, biological, pharmacological, or other properties or uses that are determined by the presence of specific chemical functional groups, which are usually dissimilar to those of the backbone chain of the polymer.

As known to one of ordinary skill in the art, a styrene is a derivative of benzene ring that has a vinylic moiety. As used herein, a "styrenic comonomer" is a monomer comprised of a benzene with a vinylic functional group. In some embodiments, the vinylic functional group of the styrenic comonomer is the moiety that participates in a reaction. In some embodiments, the sulfur diradicals can link to the vinylic moieties of the styrenic comonomers to form the sulfur-styrenic polymer. In further embodiments, the styrenic comonomer may comprise at least one other reactive functional group in addition to the vinyl moiety, such as another vinyl or an epoxide moiety. In other embodiments, the other reactive functional group may be a halogen, an alkyl halide, an alkyl, an alkoxy, an amine, or a nitro functional group. For instance, an epoxy-functionalized styrenic comonomer is defined as a styrenic comonomer having at least one epoxy functional group. Other non-limiting examples of styrenic comonomers include bromostyrene, chlorostyrene, (trifluoromethyl)styrene, fluorostyrene, vinylaniline, acetoxystyrene, methoxystyrene, ethoxystyrene, methylstyrene, nitrostyrene, vinylbenzoic acid, vinylanisole, and vinylbenzyl chloride.

As used herein, the term "epoxide monomer" is a monomer that has epoxide functional groups. Non-limiting examples of such monomers include, generally, mono- or polyoxiranylbenzenes, mono- or polyglycidylbenzenes, mono- or polyglycidyloxybenzenes, mono- or polyoxiranyl (hetero)aromatic compounds, mono- or polyglycidyl(hetero)

aromatic compounds, mono- or polyglycidyloxy(hetero)aromatic compounds, diglycidyl bisphenol A ethers, mono- or polyglycidyl(cyclo)alkyl ethers, mono- or polyepoxy(cyclo)alkane compounds and oxirane-terminated oligomers. In one preferred embodiment, the epoxide monomers may be benzyl glycidyl ether and tris(4-hydroxyphenyl)methane triglycidyl ether. In certain embodiments, the epoxide monomers may include a (hetero)aromatic moiety such as, for example, a phenyl, a pyridine, a triazine, a pyrene, a naphthalene, or a polycyclic (hetero)aromatic ring system, bearing one or more epoxide groups. For example, in certain embodiments, the one or more epoxide monomers are selected from epoxy(hetero)aromatic compounds, such as styrene oxide and stilbene oxide and (hetero)aromatic glycidyl compounds, such as glycidyl phenyl ethers (e.g., resorcinol diglycidyl ether, glycidyl 2-methylphenyl ether), glycidylbenzenes (e.g., (2,3-epoxypropyl)benzene) and glycidyl heteroaromatic compounds (e.g., N-(2,3-epoxypropyl)phthalimide). In other embodiments, the epoxide monomer is a glycidol. In certain desirable embodiments, an epoxide monomer may have a boiling point greater than 180° C., greater than 200° C., or even greater than 230° C. at the pressure at which polymerization is performed (e.g., at standard pressure, or at other pressures).

As used herein, the term "amine monomer" is a monomer that has an amine functional group. In one embodiment, aromatic amines and multi-functional amines may be used. Amine monomers include, but are not limited to, aromatic amines, vinylaniline, m-phenylenediamine, and p-phenylenediamine. The various types of phenylenediamines are inexpensive reagents due to their wide-spread use in the preparation of many conventional polymers, e.g., polyureas, polyamides.

As used herein, the term "thiol monomer" is a monomer that has a thiol functional group. Thiol monomers include, but are not limited to, 4,4'-thiobisbenzenethiol and the like. The term "sulfide monomers" are monomers that have sulfide functional groups.

As used herein, an alkynylly unsaturated monomer is a monomer that has an alkynylly unsaturated functional group (i.e. triple bond). The term "alkynylly unsaturated monomer" does not include compounds in which the alkynyl unsaturation is part of a long chain alkyl moiety (e.g., unsaturated fatty acids, or carboxylic salts, or esters such as oleates, and unsaturated plant oils). In one embodiment, aromatic alkynes, both internal and terminal alkynes, multi-functional alkynes may be used. Examples of alkynylly unsaturated monomers include, but are not limited to, ethynylbenzene, 1-phenylpropyne, 1,2-diphenylethyne, 1,4-diethynylbenzene, 1,4-bis(phenylethynyl)-benzene, and 1,4-diphenylbuta-1,3-diyne.

As used herein, the term "nitrone monomer" is a monomer that has a nitrone group. In one embodiment, nitrones, dinitrones, and multi-nitrones may be used. Examples include, but are not limited to, N-benzylidene-2-methylpropan-2-amine oxide.

As used herein, an "aldehyde monomer" is a monomer that has an aldehyde functional group. In one embodiment, aldehydes, dialdehydes, and multi-aldehydes may be used.

As used herein, the term "ketone monomer" is a monomer that has a ketone functional group. In one embodiment, ketones, di-ketones, and multi-ketones may be used.

As used herein, the term "thiirane monomer" is a monomer that has a thirane functional group. Non-limiting examples of thiirane monomers include, generally, mono- or polythiiranylbenzenes, mono- or polythiiranylmethylbenzenes, mono- or polythiiranyl(hetero)aromatic compounds, mono- or polythiiranylmethyl(hetero)-aromatic compounds, dithiiranylmethyl bisphenol A ethers, mono- or polydithiiranyl (cyclo)alkyl ethers, mono- or polyepisulfide(cyclo)alkane compounds, and thiirane-terminated oligomers. In some embodiments, thiirane monomers may include a (hetero)aromatic moiety such as, for example, a phenyl, a pyridine, a triazine, a pyrene, a naphthalene, or a poly cyclic (hetero)aromatic ring system, bearing one or more thiirane groups. In certain desirable embodiments, a thiirane monomer can have a boiling point greater than 180° C., greater than 200° C. or even greater than 230° C. at the pressure at which polymerization is performed (e.g., at standard pressure).

As used herein, an ethylenically unsaturated monomer is a monomer that contains an ethylenically unsaturated functional group (i.e. double bond). The term "ethylenically unsaturated" may be used interchangeably with the term "unsaturated". One of ordinary skill in the art will understand that "unsaturated" refers to the C=C functional group. The term "ethylenically unsaturated monomer" does not include cyclopentadienyl species such as cyclopentadiene and dicyclopentadiene. The term "ethylenically unsaturated monomer" does not include compounds in which the ethylenic unsaturation is part of a long chain alkyl moiety (e.g. unsaturated fatty acids such as oleates, and unsaturated plant oils).

Non-limiting examples of ethylenically unsaturated monomers include vinyl monomers, acryl monomers, (meth)acryl monomers, unsaturated hydrocarbon monomers, and ethylenically-terminated oligomers. Non-limiting examples of such monomers include, generally, mono- or polyvinylbenzenes, mono- or polyisopropenylbenzenes, mono- or polyvinyl(hetero)aromatic compounds, mono- or polyisopropenyl(hetero)-aromatic compounds, acrylates, methacrylates, alkylene di(meth)acrylates, bisphenol A di(meth)acrylates, benzyl (meth)acrylates, phenyl(meth)acrylates, heteroaryl (meth)acrylates, terpenes (e.g., squalene) and carotene. In some embodiments, non-limiting examples of ethylenically unsaturated monomers that are non-homopolymerizing include allylic monomers, isopropenyls, maleimides, norbornenes, vinyl ethers, and methacrylonitrile. In other embodiments, the ethylenically unsaturated monomers may include a (hetero)aromatic moiety such as, for example, phenyl, pyridine, triazine, pyrene, naphthalene, or a polycyclic (hetero)aromatic ring system, bearing one or more vinylic, acrylic or methacrylic substituents. Non-limiting examples of such monomers include benzyl (meth)acrylates, phenyl (meth)acrylates, divinylbenzenes (e.g., 1,3-divinylbenzene, 1,4-divinylbenzene), isopropenylbenzene, styrenics (e.g., styrene, 4-methylstyrene, 4-chlorostyrene, 2,6-dichlorostyrene, 4-vinylbenzyl chloride), diisopropenylbenzenes (e.g., 1,3-diisopropenylbenzene), vinylpyridines (e.g., 2-vinylpyridine, 4-vinylpyridine), 2,4,6-tris((4-vinylbenzyl)thio)-1,3,5-triazine and divinylpyridines (e.g., 2,5-divinylpyridine). In certain embodiments, the ethylenically unsaturated monomers (e.g., including an aromatic moiety) bear an amino (i.e., primary or secondary) group, a phosphine group or a thiol group. One example of such a monomer is vinyldiphenylphosphine. In certain desirable embodiments, an ethylenically unsaturated monomer will have a boiling point greater than 180° C., greater than 200° C., or even greater than 230° C. at the pressure at which polymerization is performed (e.g., at standard pressure).

The term "CHIP" is used herein to refer to a chalcogenide hybrid inorganic/organic polymer. The term "CHIP" is used herein interchangeably with "chalcogenide hybrid inorganic/organic polymer."

The term "CHIP polymer(ic) material" is used interchangeably with the term "CHIP(s) material" as used herein refers generally to organic/inorganic polymeric materials comprised of chalcogen units (e.g., S, Se) and organic comonomers. CHIP materials encompassed by the present invention may range in the composition from 10-90 wt % sulfur, with unsaturated organic, inorganic, or hybrid comonomers (e.g., styrenic comonomer, amine monomer, thiol monomer, alkynylly unsaturated monomer, nitrone monomer, aldehyde monomer, ketone monomer, epoxide monomer, thiirane monomer, ethylenically unsaturated monomer, etc.) ranging from 90-10 wt %. Without wishing to limit the invention to a particular theory, the CHIPs material may be comprised of chalcogenide covalent bonds in the polymer (e.g., S—S bonds) that are dynamic covalent bonds and stimuli-responsive to heat, mechanical stress, or light that enables crosslinking of a thin film.

As known to one of ordinary skill in the art, the term "visible" refers to a portion of the electromagnetic spectrum that falls in the range of 390 nm to 700 nm. As used herein, the term "infrared" (IR) refers to a portion of the electromagnetic spectrum that falls in the range of 700 nm to 1 mm. Subsets of the IR spectrum include near-IR (700 nm to 3 μm), mid-IR (3-8 μm), long-wavelength IR (8-15 μm) and far-IR (15 μm to 1 mm).

As used herein, the term "infrared" (IR) refers to a portion of the electromagnetic spectrum that falls in the range of 700 nm to 1 mm. Subsets of the IR spectrum include near-IR (700 to 1100 nanometers), shortwave IR (SWIR) (1100 to 3000 nanometers), mid-IR (3-8 μm), long-wavelength IR (8-15 μm) and far-IR.

"A smart device" is an electronic device, generally connected to other devices or networks via different wireless protocols such as Bluetooth, NFC, Wi-Fi, LiFi, 3G, 4G, 5G, etc., that can operate to some extent interactively and autonomously. Several notable types of smart devices are smartphones, phablets and tablets, smartwatches, smart bands, smart key chains and smart speakers. The term can also refer to a device that exhibits some properties of ubiquitous computing, including artificial intelligence (AI).

The term "substrate" as herein refers to a surface on which a film of the invention can adhere. Non-limiting examples include glass, a high refractive index infrared optical material (such as germanium, silicon, or zinc selenide), or other transmissive materials.

As used herein, the term "medium" may include potential polymer claddings such as polymethylmethacrylate, polycarbonate, polystyrene, cellulose acetate, and polydimethylsiloxane, ZPU (ChemOptics), polyimide, polyester, optical epoxy, acrylate copolymers. Furthermore, 'medium' may include substrates that can act as claddings such as borosilicate glass, fused silica, silicon dioxide on silicon, and sapphire.

As used herein, the term "photoresponsive medium" refers to a material that is able to respond to light irradiation by undergoing changes in at least its refractive index or solubility in organic solvent. In some embodiments, the change to the refractive index and/or solubility may be irreversible. Non-limiting examples of organic solvents include alcohols, such as methanol or ethanol; aldehydes such as acetone; aromatics solvents, such as benzene, toluene, chlorobenzene, or dicholorobenzene; nonpolar aprotic solvents, such as tetrahydrofuran or dichloromethane; and other organic solvents known in the art.

As used herein, the term "high-refractive-index polymer" (HRIP) is a polymer that has a refractive index greater than 1.5.

As used herein, the terms "those defined above" and "those defined herein" when referring to a variable incorporates by reference the broad definition of the variable as well as any narrow and/or preferred and more or most preferred definitions, if any.

Sulfur Copolymers

Figure 1:
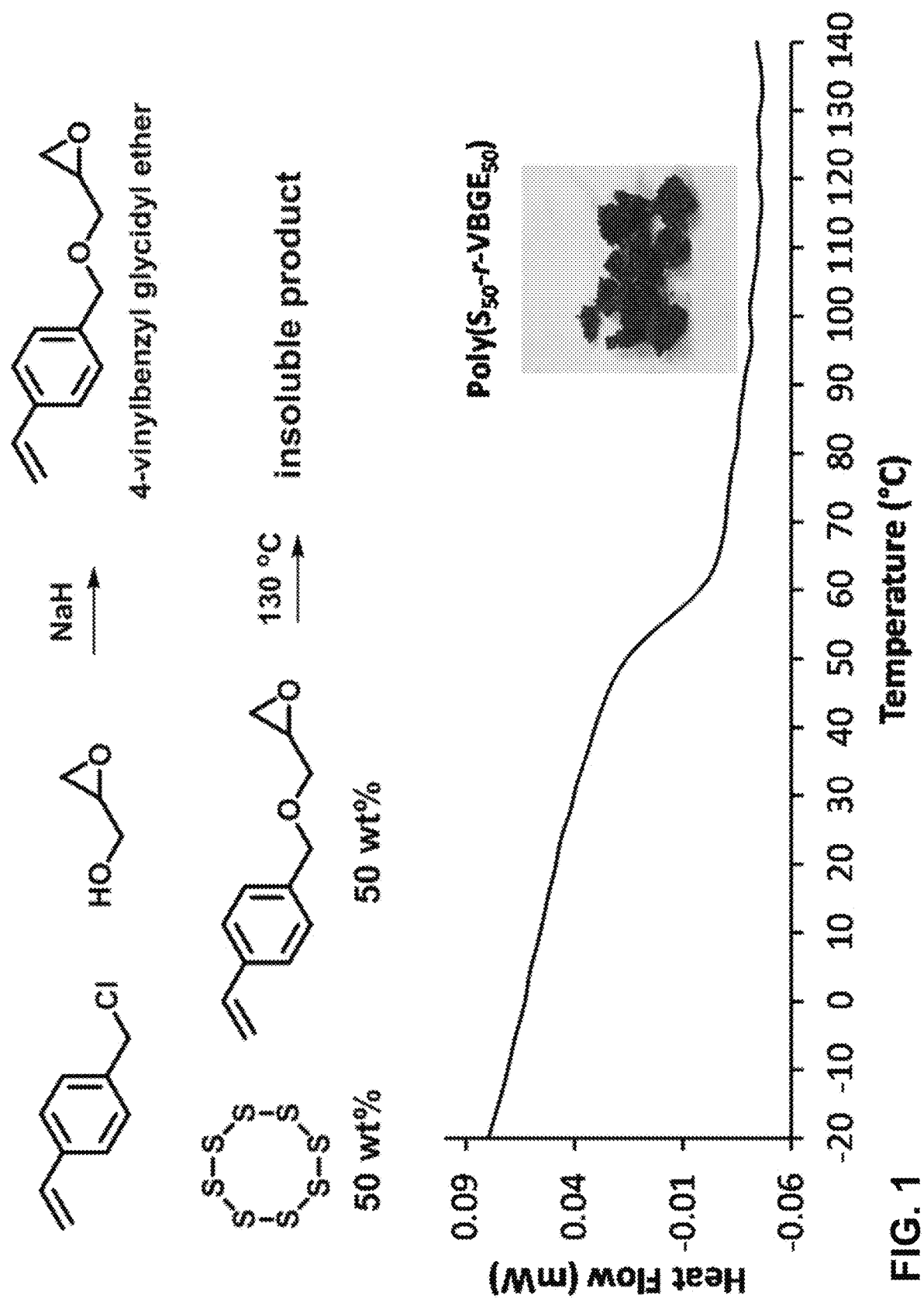
FIG. 1 shows a non-limiting embodiment of the present invention where elemental sulfur is reacted with 4-vinylbenzyl glycidyl ether to form a sulfur copolymer.
Figure 2:
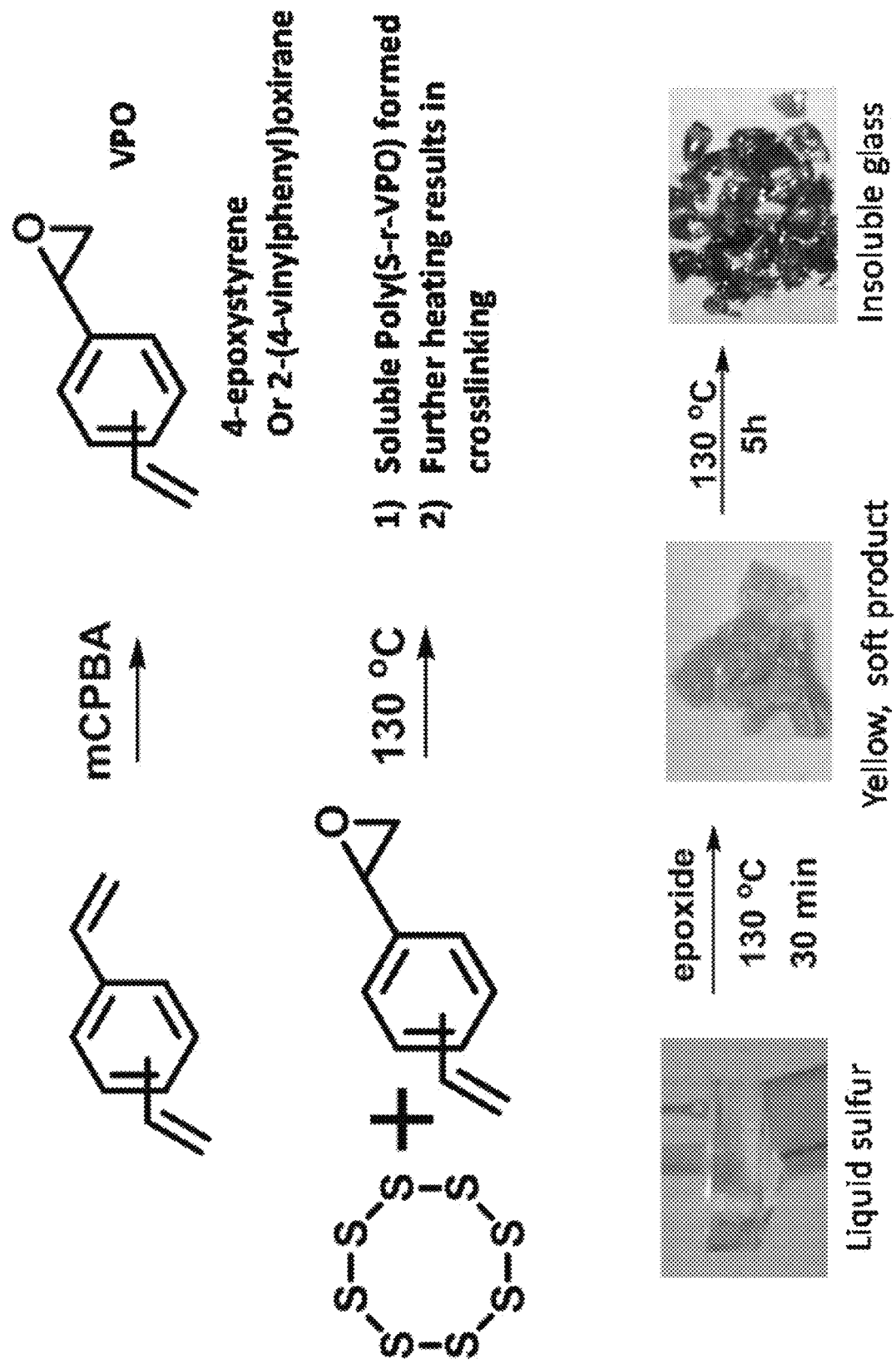
FIG. 2 shows another non-limiting embodiment of the present invention where elemental sulfur is reacted with 2-(4-vinylphenyl)oxirane (VPO) to form a sulfur copolymer.
Figure 3:
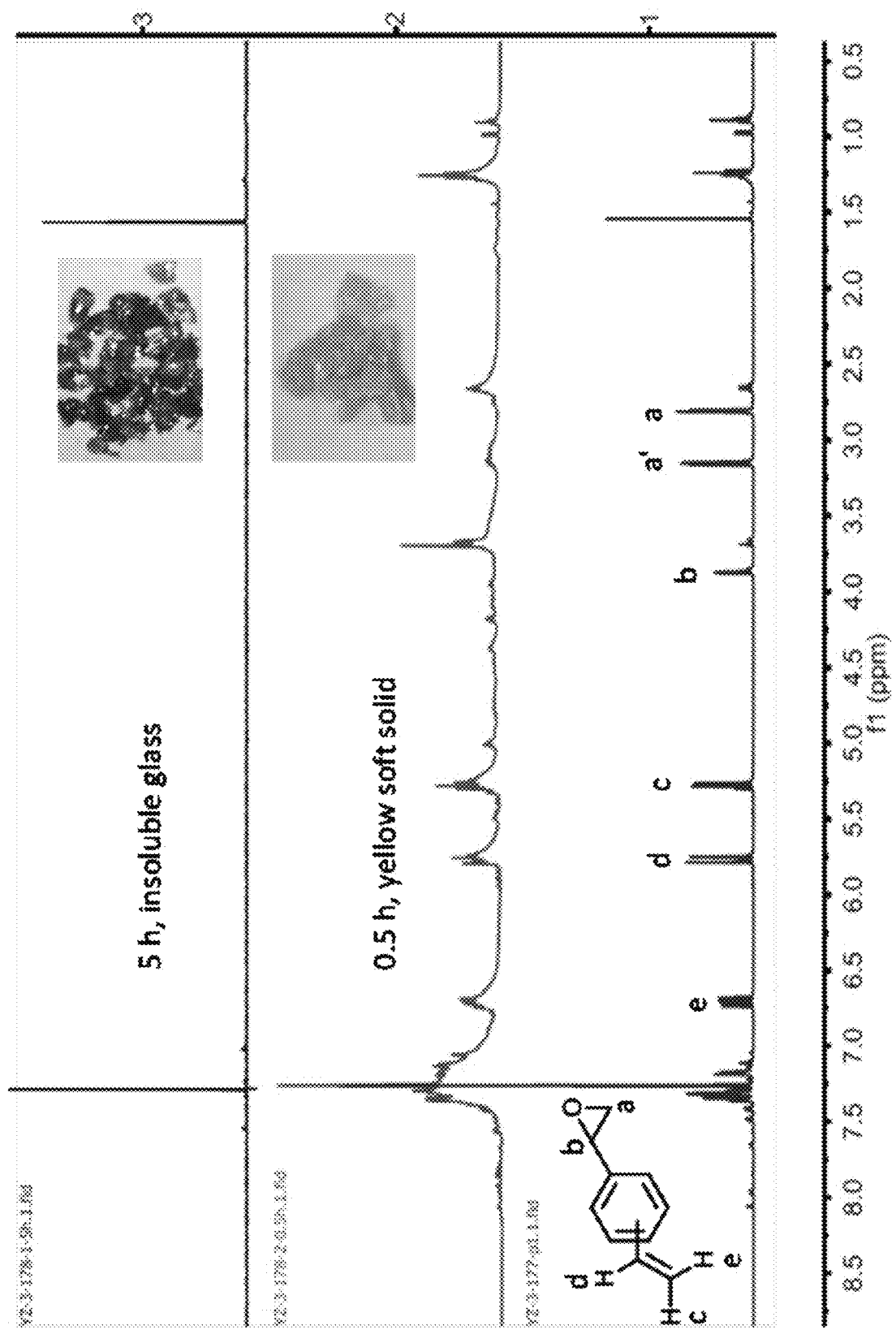
FIG. 3 shows an NMR spectral comparison of VPO (bottom), a sulfur copolymer product of elemental sulfur and VPO after 30 minutes of heating (middle), and the sulfur copolymer product after 5 hours of heating (top).

Referring now to FIG. 1-3, in some embodiments, the present invention features a method of synthesizing a sulfur copolymer. The method may comprise providing elemental sulfur, melting the elemental sulfur to form liquid sulfur monomers having reactive sulfur groups, providing one or more epoxy-functionalized styrenic comonomers having an epoxide moiety and a vinylic moiety, and adding the comonomers to the liquid sulfur monomers. Without wishing to limit the invention to a particular theory or mechanism, the reactive sulfur groups of the liquid sulfur monomers can copolymerize with the epoxide or vinylic moiety of the epoxy-functionalized styrenic comonomers to form a crosslinked network of the sulfur copolymer.

In some embodiments, the sulfur copolymer may be an insoluble polymer. In other embodiments, the sulfur copolymer may be a thermoset. In some embodiments, a glass transition temperature of the sulfur copolymer may be at least about 50° C.

In some embodiments, at least about 50 wt % of elemental sulfur is provided. In other embodiments, about 50-60 wt % of elemental sulfur is provided. In still other embodiments, about 60-70 wt %, or about 70-80 wt %, or about 80-90 wt %, or about 90-95 wt % of elemental sulfur is provided.

In some embodiments, about 5-50 wt % of epoxy-functionalized styrenic comonomers are provided. In other embodiments, about 5-15 wt % of epoxy-functionalized styrenic comonomers are provided. In still other embodiments, about 10-20 wt %, or about 20-30 wt %, or about 30-40 wt %, or about 40-50 wt % of epoxy-functionalized styrenic comonomers are provided.

In some embodiments, the step of providing one or more epoxy-functionalized styrenic comonomers may comprise providing styrenic monomers, and reacting the styrenic monomers with a compound capable of forming or adding an epoxide moiety to the styrenic monomer while maintaining a vinylic group of the styrenic monomer, thus forming epoxy-functionalized styrenic comonomers. Examples of providing one or more epoxy-functionalized styrenic comonomers are described later herein. In non-limiting embodiments, the epoxy-functionalized styrenic comonomers may be 4-vinylbenzyl glycidyl ether or 2-(4-vinylphenyl)oxirane).

In some embodiments, the reactive sulfur groups of the liquid sulfur monomers may comprise sulfur radicals and sulfur anionic species. In one embodiment, the vinylic moiety of the epoxy-functionalized styrenic comonomers can react with the sulfur radicals via a thiol-ene reaction. In another embodiment, the epoxide moiety of the epoxy-functionalized styrenic comonomers can react with the sulfur radicals or sulfur anionic species via ring-opening polymerization. Without wishing to limit the invention to a particular theory or mechanism, oxiranes and epoxides may be ring-opened by neutral nucleophiles, or anionically by nucleophilic anions such as by alkoxides or thiolates, which are sulfur anionic species. This direct copolymerization of liquid sulfur monomers (via inverse vulcanization), or polysulfides such as poly(styrene-random-sulfur) (via dynamic covalent polymerization) is unexpected, and advantageously provides a novel polymerization pathway to make new sulfur copolymers.

In some embodiments, the elemental sulfur is heated to a temperature of about 120° C. to 135° C. to melt and form the liquid sulfur monomers. After the comonomers are added, the mixture of liquid sulfur monomer and comonomers may be mixed and continuously heated for a period of time ranging from about 30 minutes to 6 hours. During this time, the liquid sulfur monomer and comonomers can be polymerizing and forming cross-links. In some embodiments, the sulfur copolymer may be in the form of an insoluble product or glassy solid.

In further embodiments, the method may further comprise reacting the sulfur copolymer with one or more termonomers to form a sulfur terpolymer. The technique of reacting can be oxidative coupling, free radical polymerization, or copolymerization. In some embodiments, the termonomers may be vinyl monomers, isopropenyl monomers, acryl monomers, methacryl monomers, unsaturated hydrocarbon monomers, epoxide monomers, thiirane monomers, alkynyl monomers, diene monomers, butadiene monomers, isoprene monomers, norbornene monomers, amine monomers, thiol monomers, sulfide monomers, alkynylly unsaturated monomers, nitrone monomers, aldehyde monomers, ketone monomers, ethylenically unsaturated, or combinations thereof. In some embodiments, the termonomers are about 5-50 wt % of the sulfur terpolymer. In other embodiments, the termonomers are about 5-15 wt %, or about 10-20 wt %, or about 20-30 wt %, or about 30-40 wt %, or about 40-50 wt % of the sulfur terpolymer.

In some embodiments, the liquid sulfur comprises dynamic sulfur-sulfur (S—S) bonds. The dynamic S—S bonds can be broken by heating to form the sulfur radicals that can copolymerize with the comonomers. In one embodiment, the elemental sulfur is melted at a temperature of about 120-140° C. For instance, the elemental sulfur is melted at a temperature of about 130° C. As used herein, the term "dynamic" is defined reversibly breaking of bonds. The introduction of S—S bonds into an intractable polymer material, or cross-linked polymer network, can allow for re-processing of the polymer material due to dynamic breaking of S—S bonds. In one embodiment, the sulfur polymers described herein are dynamic covalent polymers. The dynamic covalent polymers may comprise S—S bonds and some other polymer segment that is intractable, or cross-linked. Stimuli, such as thermal, light, or another form of stimuli, can induce dynamic activation of S—S bonds to enable re-processing, or melt processing of otherwise non-reversible, processable polymeric materials.

According to another embodiment, the present invention features a sulfur copolymer comprising a copolymerized product of at least about 50 wt % of sulfur monomers derived from elemental sulfur, and about 5-50 wt % of epoxy-functionalized styrenic comonomers having with an epoxide moiety and a vinylic moiety. Without wishing to limit the invention to a particular theory or mechanism, the copolymerization of the sulfur monomers with the epoxide or vinylic moiety of the epoxy-functionalized styrenic comonomers forms a crosslinked network of the sulfur copolymer.

In one embodiment, the sulfur copolymer may be an insoluble polymer. In another embodiment, the sulfur copolymer may be a thermoset. In some embodiments, a glass transition temperature of the sulfur copolymer may be at least about 50° C. In other embodiments, the sulfur monomers may comprise S—S bonds that, when broken, are capable of being reconnected by thermal reforming.

In some embodiments, the sulfur copolymer may comprise about 50-60 wt % of sulfur monomers. In other embodiments, the sulfur copolymer may comprise about 60-70 wt %, or about 70-80 wt %, or about 80-90 wt %, or about 90-95 wt % of sulfur monomers.

In some embodiments, the sulfur copolymer may comprise about 5-15 wt % of epoxy-functionalized styrenic comonomers. In other embodiments, the sulfur copolymer may comprise about 10-20 wt %, or about 20-30 wt %, or about 30-40 wt %, or about 40-50 wt % of epoxy-functionalized styrenic comonomers. Non-limiting examples of the epoxy-functionalized styrenic comonomers include 4-vinylbenzyl glycidyl ether or 2-(4-vinylphenyl)oxirane).

Consistent with previous embodiments, the sulfur copolymer may further comprise an elemental carbon material dispersed in the sulfur copolymer at a level in the range of up to about 50 wt % of the sulfur copolymer. For example, the carbon material is at most about 5 wt %, or at most about 10 wt %, or at most about 20 wt %, or at most about 30 wt %, or at most about 40 wt %, or at most about 50 wt % of the sulfur polymer.

In further embodiments, the sulfur copolymer may further comprise about 5 to 50 wt % of one or more termonomers. For instance, the one or more termonomers are at a level of about 5 to about 10 wt %, or about 10 to about 20 wt %, or about 20 to about 30 wt %, or about 30 to about 40 wt %, or about 40 to about 50 wt % of the sulfur polymer. In some embodiments, the termonomers may be vinyl monomers, isopropenyl monomers, acryl monomers, methacryl monomers, unsaturated hydrocarbon monomers, epoxide monomers, thiirane monomers, alkynyl monomers, diene monomers, butadiene monomers, isoprene monomers, norbornene monomers, amine monomers, thiol monomers, sulfide monomers, alkynylly unsaturated monomers, nitrone monomers, aldehyde monomers, ketone monomers, ethylenically unsaturated, or combinations thereof.

In other embodiments, Fréchet-type benzyl ether dendrimers bearing styrenic terminal groups are miscible with liquid sulfur and can be used as polyfunctional cross-linkers. In certain embodiments, the one or more polyfunctional monomers include one or more of a divinylbenzene, a diisopropenylbenzene, an alkylene di(meth)acrylate, a bisphenol A di(meth)acrylate, a terpene, a carotene, a divinyl (hetero)aromatic compound, and a diisopropenyl (hetero) aromatic compound. In other embodiments, a polyfunctional monomer can have one or more amine, thiol, sulfide, alkynylly unsaturated, nitrone and/or nitroso, aldehyde, ketone, thiirane, ethylenically unsaturated, and/or epoxide moieties; and one or more amine, thiol, sulfide, alkynylly unsaturated, nitrone and/or nitroso, aldehyde, ketone, thiirane, ethylenically unsaturated, and/or epoxide moieties, wherein the first and second moieties are different. A non-limiting example is a divinylbenzene monoxide.

Alternative embodiments of the sulfur copolymer may further comprise one or more monofunctional monomers, or one or more polyfunctional monomers (e.g., difunctional or trifunctional). The one or more polyfunctional monomers is selected from a group consisting of a polyvinyl monomer (e.g., divinyl, trivinyl), a polyisopropenyl monomer (e.g., diisoprenyl, triisoprenyl), a polyacryl monomer (e.g., diacryl, triacryl), a polymethacryl monomer (e.g., dimethacryl, trimethacryl), a polyunsaturated hydrocarbon monomer (e.g., diunsaturated, triunsaturated), a polyepoxide monomer (e.g., diepoxide, triepoxide), a polythiirane monomer (e.g., dithiirane, trithiirane), a polyalkynyl monomer, a polydiene monomer, a polybutadiene monomer, a polyisoprene monomer, a polynorbornene monomer, a polyamine monomer, a polythiol monomer, a polysulfide monomer, a polyalkynylly unsaturated monomers, a polynitrone monomers, a polyaldehyde monomers, a polyketone monomers, and a polyethylenically unsaturated monomers.

In some embodiments, the one or more polyfunctional monomers is selected from a group consisting of a divinylbenzene, a diisopropenylbenzene, an alkylene di(meth)acrylate, a bisphenol A di(meth)acrylate, a terpene, a carotene, a divinyl (hetero)aromatic compound and a diisopropenyl (hetero)aromatic compound. In other embodiments, a polyfunctional monomer can have one or more amine, thiol, sulfide, alkynylly unsaturated, nitrone and/or nitroso, aldehyde, ketone, thiirane, ethylenically unsaturated, and/or epoxide moieties; and one or more amine, thiol, sulfide, alkynylly unsaturated, nitrone and/or nitroso, aldehyde, ketone, thiirane, ethylenically unsaturated, and/or epoxide moieties, wherein the first and second moieties are different. A non-limiting example is a divinylbenzene monoxide.

In some embodiments, the one or more polyfunctional monomers are at a level of about 2 to about 50 wt %, or about 2 to about 10 wt %, or about 10 to about 20 wt %, or about 20 to about 30 wt %, or about 30 to about 40 wt %, or about 40 to about 50 wt % of the sulfur polymer. In other embodiments, the one or more monofunctional monomers are at a level up to about 5 wt %, or about 10 wt %, or about 15 wt % of the sulfur polymer.

Consistent with previous embodiments, the copolymerization of the sulfur monomers with the comonomers can occur via a thiol-ene reaction or other related processes. For example, a sulfur radical can react with a C—C double bond of the comonomer. In other embodiments, the epoxide moiety of the epoxy-functionalized styrenic comonomers can copolymerize with the sulfur monomers via ring-opening polymerization by neutral nucleophiles, or anionically by nucleophilic anions such as alkoxides or thiolates (the sulfur anionic species).

Examples of polymerization techniques that may be used in accordance with the present invention include, but are not limited to, free radical polymerization, controlled radical polymerization, ring-opening polymerization, ring-opening metathesis polymerization, step-growth polymerization, and chain-growth polymerization. When polymerizing the elemental sulfur with the co monomers, a functional sulfur moiety of the elemental sulfur can bond with at least one functional moiety, i.e. the alkene moiety or epoxide moiety, of the comonomers.

A person of skill in the art will select conditions that provide the desired level of polymerization. In certain embodiments, the polymerization reaction is performed under ambient pressure. However, in other embodiments, the polymerization reaction can be performed at elevated pressure (e.g., in a bomb or an autoclave). Elevated pressures can be used to polymerize more volatile comonomers, so that they do not vaporize under the elevated temperature reaction conditions.

In certain embodiments, it can be desirable to use a nucleophilic viscosity modifier in liquefying the elemental sulfur, for example, before adding the comonomers. For example, in certain embodiments, the elemental sulfur is first heated with a viscosity modifier, then the viscosity-modified elemental sulfur is heated with the comonomers. The nucleophilic viscosity modifier can be, for example, a phosphorus nucleophile (e.g., a phosphine), a sulfur nucleophile (e.g., a thiol) or an amine nucleophile (e.g., a primary or secondary amine). When the elemental sulfur is heated in the absence of a nucleophilic viscosity modifier, the elemental sulfur ring can open to form, e.g., diradicals, which can combine to form linear polymer chains which can provide a relatively high overall viscosity to the molten material. Nucleophilic viscosity modifiers can break these linear chains into shorter lengths, thereby making shorter polymers that lower the overall viscosity of the molten material, making the elemental sulfur mixture easier to mix with and other species, and easier to stir for efficient processing.

Some of the nucleophilic viscosity modifier may react and be retained as a covalently bound part of the polymer, and some will react to form separate molecular species, with the relative amounts depending on nucleophile identity and reaction conditions. While some of the nucleophilic viscosity modifier may end up as a separate molecular species from the polymer chain, as used herein, nucleophilic viscosity modifiers may become part of the polymer. Non-limiting examples of nucleophilic viscosity modifiers include triphenylphosphine, aniline, benzenethiol, and N,N-dimethylaminopyridine. Nucleophilic viscosity modifiers can be used, for example, in an amount up to about 10 wt %, or even up to about 5 wt % of the sulfur polymer. When a nucleophilic viscosity modifier is used, in certain embodiments it can be used in the range of about 5 wt % to about 15 wt % of the sulfur copolymer.

In certain embodiments, a monofunctional comonomer can be used to reduce the viscosity of the sulfur copolymer, for example, before adding other comonomers (e.g., before adding any polyfunctional comonomer). For example, in certain embodiments, the elemental sulfur is first heated with one or more monofunctional comonomers. While not intending to be bound by theory, the inventors surmise that inclusion of monofunctional comonomers into the poly (sulfur) chains disrupts intermolecular associations of the elemental sulfur, and thus decreases the viscosity. The monofunctional comonomer can be, for example, a mono (meth)acrylate such as benzyl methacrylate, a mono(oxirane) such as a styrene oxide or a glycidyl phenyl ether, or a mono(thiirane) such as t-butyl thiirane or phenoxymethylthiirane. A monofunctional comonomer can be used to modify the viscosity of the sulfur polymer, for example, in an amount up to about 10 wt %, up to about 5 wt %, or even up to about 2 wt % of the polymer. When a monofunctional monomer can be used to modify the viscosity of the sulfur polymer, in certain embodiments it can be used in the range of about 0.5 wt % to about 5 wt %, or even about 0.5 wt % to about 3 wt % of the sulfur polymer.

Of course, viscosity modification is not required, so in other embodiments, the elemental sulfur is heated together with the comonomers (and particularly with one or more polyfunctional comonomers) without viscosity modification. In other embodiments, a solvent, e.g., a halobenzene such as 1,2,4-trichlorobenzene, a benzyl ether, or a phenyl ether, can be used to modify the viscosity of the materials for ease of handling. The solvent can be added, for example, to the elemental sulfur or sulfur copolymers before reaction with a comonomer in order to reduce its viscosity, or to the polymerized material in order to aid in processing into a desired form factor.

In alternative embodiments, the sulfur copolymers described herein can be effectively thermoplastic in nature. A person of skill in the art will understand that methods familiar in the thermoplastic industries, such as injection molding, compression molding, and melt casting, may be used in forming articles from the materials described herein.

Without wishing to limit the present invention, the sulfur monomers copolymerizing with both the epoxide and the vinylic moieties form a crosslinked network of the sulfur copolymer, which is surprising because epoxide groups do not typically react with sulfur radicals as known to one of ordinary skill in the art. Contrary to this belief, the inventors surprisingly discovered that the sulfur monomers copolymerized with both the epoxide moiety and the vinylic moiety of the comonomer to form a cross-linked structure.

In some embodiments, chalcogenide hybrid inorganic/organic polymers (CHIP) are prepared from one or more chalcogenic monomers. The chalcogenic monomer may be selected from a group consisting of elemental sulfur, a liquid polysulfide, an oligomer containing sulfur, and an oligomer containing sulfur and selenium units. In further embodiments, the chalcogenic monomers may comprise sulfur monomers derived from elemental sulfur, and elemental selenium (See) or selenium sulfide, or a combination thereof.

In further embodiments, the chalcogenic monomers may comprise one or more cyclic selenium sulfide monomers having the formula $Se_nS_{(6-n)}$. In another embodiment, the cyclic selenium sulfide monomers can include any isomer of the formula. In some embodiments, n in an integer that can range from 1 to 7. For example, when n=2, the cyclic selenium sulfide monomers have the formula $Se_2S_6$. As another example, when n=3, the cyclic selenium sulfide monomers have the formula $Se_3S_5$. Preferably, the one or more cyclic selenium sulfide monomers can comprise all possible isomers of a specific formula. In alternative embodiments, the selenium sulfide monomers can be of the formula $Se_nS_m$, where n ranges from 1 to 7 and m ranges from 1 to 7, and the selenium sulfide monomers are not necessarily cyclic. In one embodiment, assuming that n=7, i.e. $Se_7S$, then the cyclic selenium sulfide monomers may comprise at most about 70 wt % of selenium.

In some embodiments, the CHIP may comprise one or more sulfur monomers derived from elemental sulfur at a level of at least 35 wt % of the CHIP, elemental selenium ($Se_8$) at a level of at least 35 wt % of the CHIP, and one or more comonomers each selected from a group consisting of amine comonomers, thiol comonomers, sulfide comonomers, alkynylly unsaturated comonomers, epoxide comonomers, nitrone comonomers, aldehyde comonomers, ketone comonomers, thiirane comonomers, ethylenically unsaturated comonomers, styrenic comonomers, vinylic comonomers, methacrylate comonomers, acrylonitrile comonomers, allylic monomers, acrylate monomers, vinylpyridine monomers, isobutylene monomers, maleimide monomers, norbornene monomers, norboradiene monomers, norbornadiene based monomers, monomers having at least one vinyl ether moiety, and monomers having at least one isopropenyl moiety, at a level in the range of about 5-50 wt % of the CHIP.

In one embodiment, for example, the CHIP may comprise at least about 50 wt % of the sulfur monomers. In another embodiment, the CHIP may comprise at least about 50 wt % of $Se_8$. In a further embodiment, the CHIP may comprise about 35-50 wt % of sulfur monomers, about 35-50 wt % of elemental selenium, and about 15-25 wt % of the comonomers.

In some embodiments, any of the CHIP described herein may further comprise at least about 35 wt % of chalcogenic monomers. In other embodiments, the chalcogenic monomers can be at a range of about 35 to 50 wt %, or about 50 to 60 wt %, or about 60 to 70 wt %, or about 70 to 80 wt %, or about 80 to 99 wt % of the CHIP.

In other embodiments, the CHIP may comprise one or more chalcogenic monomers at a level of at least 35 wt % of the CHIP, and one or more one or more triazine and/or phosphazene moieties, at a level in the range of about 5-50 wt % of the CHIP. In one embodiment, the chalcogenic monomers are may comprise elemental sulfur, a liquid polysulfide, a liquid chalcogenide polymer, an oligomer containing sulfur, an oligomer containing sulfur and selenium units, or a combination thereof.

In one embodiment, any of the CHIP may comprise one or more cyclic selenium sulfide monomers at a range of about 5 to 10 wt %, or about 10 to 20 wt %, or about 20 to 30 wt %, or about 30 to 40 wt %, or about 40 to 50 wt %, or about 50 to 60 wt %, or about 60 to 70 wt % of the CHIP. In another embodiment, the cyclic selenium sulfide monomers may comprise selenium units of at most about 20 wt %, or at most about 30 wt %, or at most about 40 wt % or at most about 50 wt %, or at most about 60 wt %, or at most about 70 wt % of the cyclic selenium sulfur monomers. In a further embodiment, the cyclic selenium sulfide monomers comprises at most about 70 wt % of selenium.

In some embodiments, any of the CHIP may further comprise about 5-50 wt % of chalcogenic monomers. In other embodiments, the chalcogenic monomers can be at a range of about 5 to 10 wt %, or about 10 to 20 wt %, or about 20 to 30 wt %, or about 30 to 40 wt %, or about 40 to 50 wt % of the CHIP.

In other embodiments, any of the CHIP described herein may comprise the one or more comonomers at a range of about 5 to 10 wt %, or about 10 to 20 wt %, or about 20 to 30 wt %, or about 30 to 40 wt %, or about 40 to 50 wt % of the CHIP.

In other embodiments, any of the CHIP may further comprise about 5-50 wt % of elemental sulfur (Se). In other embodiments, the elemental sulfur can be at a range of about 5 to 10 wt %, or about 10 to 20 wt %, or about 20 to 30 wt %, or about 30 to 40 wt %, or about 40 to 50 wt % of the CHIP.

In still other embodiments, any of the CHIP may further comprise about 5-50 wt % of elemental selenium (See). In further embodiments, the elemental selenium can be at a range of about 5 to 10 wt %, or about 10 to 20 wt %, or about 20 to 30 wt %, or about 30 to 40 wt %, or about 40 to 50 wt % of the CHIP.

In some embodiments, any of the CHIP comprises at least about 50 wt % sulfur monomers. In other embodiments, the one or more comonomers are at a range of about 5 to 10 wt %, or about 10 to 20 wt %, or about 20 to 30 wt %, or about 30 to 40 wt %, or about 40 to 50 wt % of the CHIP. In still other embodiments, the CHIP may further comprise at least about 35 wt %, or at least about 40 wt %, or at least about 50 wt % of elemental selenium (See).

3D Printing of Ultra-high Refractive Index Polymers

Chalcogenide-based copolymers can utilize selenium to provide for the optical properties. Incorporation of selenium in the chalcogenic sulfur copolymer can greatly increase the refractive index of said copolymers. Using the inverse vulcanization method, the chalcogenic sulfur copolymers are shown to be a viable comonomer to prepare chemically stable polymer plastic materials with tunable optical and thermochemical properties by controlling the feed ratios of the chemical monomers added. The resulting chalcogenide-based sulfur copolymer may be fabricated into useful optical devices, such as films, waveguides, and molded (nano-, micro-) objects and lenses, via 3D printing.

Referring now to FIGS. 4-8, the chalcogenic sulfur copolymers that are described herein are the first class of polymeric materials that exhibit high transparency in the short-wave and mid-IR regimes due to the presence of largely IR inactive S—S bonds. Furthermore, since these chalcogenic sulfur copolymers are readily melt, or solution processed, fabrication of free standing films, windows, or lenses can be easily conducted via 3D printing. Access to these kinds of high quality and inexpensive lenses are anticipated to open new opportunities in low cost IR optical devices and technologies including IR thermal imaging rifle scopes and home monitoring.

According to one embodiment, the present invention features a method of producing a substrate using 3D printing. The method may comprise providing a print material comprising a sulfur copolymer, introducing said print material into a 3D printer, and dispensing said print material by successively applying layers of said print material to form the substrate. In preferred embodiments, the substrate produced from the print material can have a refractive index of about 1.75-2.6 at a wavelength in a range of about 500 nm to about 8 μm.

In some embodiments, the sulfur copolymer may comprise one or more chalcogenic monomers at a level of at least 50 wt % of the sulfur copolymer, and one or more comonomers at a level in the range of about 5-50 wt % of the sulfur copolymer. In preferred embodiments, the chalcogenic monomers may comprise at least sulfur units.

In other preferred embodiments, the chalcogenic monomers may comprise sulfur and selenium units. For instance, the chalcogenic monomers may comprise elemental sulfur, liquid polysulfide, cyclic selenium sulfide and isomers thereof, oligomers containing sulfur, or oligomers containing sulfur and selenium units. In some embodiments, the oligomer containing sulfur and selenium units may be derived from elemental sulfur and elemental selenium (e.g., $Se_8$, polymeric selenium). In one embodiment, the sulfur copolymer may comprise at least about 30 wt % of sulfur. In another embodiment, the sulfur copolymer may comprise at least about 30 wt % of elemental selenium.

In some embodiments, the chalcogenic monomers may be polymerized with the one or more comonomers via free radical polymerization, controlled radical polymerization, ring-opening polymerization, ring-opening metathesis polymerization, step-growth polymerization, or chain-growth polymerization. Polymerizing the chalcogenic monomers with the comonomers enables at least one functional sulfur moiety of the chalcogenic monomers to bond with at least one functional moiety of the one or more monomers.

According to a non-limiting embodiment, the sulfur copolymer may comprise one or more cyclic selenium sulfide monomers having the formula $Se_nS_{(6-n)}$, and one or more comonomers at a level in the range of about 5-50 wt % of the sulfur copolymer. In another embodiment, the cyclic selenium sulfide monomers comprise at most about 70 wt % of selenium, and can include any isomer of the formula.

In some embodiments, n in an integer that can range from 1 to 7. For example, when n=2, the cyclic selenium sulfide monomers have the formula $Se_2S_6$. As another example, when n=3, the cyclic selenium sulfide monomers have the formula $Se_3S_5$. Preferably, the one or more cyclic selenium sulfide monomers can comprise all possible isomers of a specific formula. In alternative embodiments, the selenium sulfide monomers can be of the formula $Se_nS_m$, wherein n ranges from 1 to 7 and m ranges from 1 to 7, wherein the selenium sulfide monomers are not necessarily cyclic. In one embodiment, assuming that n=7, i.e. $Se_7S$, then the cyclic selenium sulfide monomers may comprise at most about 70 wt % of selenium.

In some embodiments, the cyclic selenium sulfide monomers are polymerized with the one or more comonomers via free radical polymerization, controlled radical polymerization, ring-opening polymerization, ring-opening metathesis polymerization, step-growth polymerization, or chain-growth polymerization. In preferred embodiments, polymerizing the comonomers with the selenium sulfide enables at least one functional sulfur moiety of the selenium sulfide to bond with at least one functional moiety of the one or more monomers.

In one embodiment, the sulfur copolymer may comprise one or more cyclic selenium sulfide monomers at a range of about 5 to 10 wt %, or about 10 to 20 wt %, or about 20 to 30 wt %, or about 30 to 40 wt %, or about 40 to 50 wt %, or about 50 to 60 wt %, or about 60 to 70 wt % of the sulfur copolymer. In another embodiment, the cyclic selenium sulfide monomers may comprise selenium units of at most about 20 wt %, or at most about 30 wt %, or at most about 40 wt % or at most about 50 wt %, or at most about 60 wt %, or at most about 70 wt % of the cyclic selenium sulfur monomers. In a further embodiment, the cyclic selenium sulfide monomers comprise at most about 70 wt % of selenium. In some embodiments, the one or more comonomers are at a range of about 5 to 10 wt %, or about 10 to 20 wt %, or about 20 to 30 wt %, or about 30 to 40 wt %, or about 40 to 50 wt % of the sulfur copolymer.

In other embodiments, the sulfur copolymer may further comprise about 5-50 wt % of elemental sulfur ($S_8$). In other embodiments, the elemental sulfur can be at a range of about 5 to 10 wt %, or about 10 to 20 wt %, or about 20 to 30 wt %, or about 30 to 40 wt %, or about 40 to 50 wt % of the sulfur copolymer.

In still other embodiments, the sulfur copolymer may further comprise about 5-50 wt % of elemental selenium (e.g., $Se_8$, polymeric selenium). In further embodiments, the elemental selenium can be at a range of about 5 to 10 wt %, or about 10 to 20 wt %, or about 20 to 30 wt %, or about 30 to 40 wt %, or about 40 to 50 wt % of the sulfur copolymer. For instance, the sulfur copolymer may comprise 30 wt % S, 35 wt % cyclic selenium-sulfide, and 35 wt % 1,3 diisopropenyl benzene.

According to another non-limiting embodiment, the sulfur copolymer may comprise one or more sulfur monomers derived from elemental sulfur at a level of at least 30 wt % of the sulfur copolymer, elemental selenium (e.g., Sea, polymeric selenium)) at a level of at least 30 wt % of the sulfur copolymer, and one or more comonomers at a level in the range of about 5-50 wt % of the sulfur copolymer. In one embodiment, the sulfur copolymer may comprise at least about 50 wt % sulfur monomers. In another embodiment, the sulfur copolymer may comprise at least about 50 wt % of elemental selenium. In an exemplary embodiment, the sulfur copolymer may comprise about 30-50 wt % of sulfur monomers, about 30-50 wt % of elemental selenium, and about 15-25 wt % of the comonomers, such as diisopropenylbenzene.

According to another embodiment, the sulfur copolymer may comprise one or more sulfur monomers derived from elemental sulfur at a level of at least 30% wt of the sulfur copolymer, and one or more comonomers at a level in the range of about 5-50 wt % of the sulfur copolymer. In some embodiments, the sulfur copolymer comprises at least about 50 wt % sulfur monomers. In other embodiments, the one or more comonomers are at a range of about 5 to 10 wt %, or about 10 to 20 wt %, or about 20 to 30 wt %, or about 30 to 40 wt %, or about 40 to 50 wt % of the sulfur copolymer. In still other embodiments, the sulfur copolymer may further comprise at least about 30 wt %, or at least about 40 wt %, or at least about 50 wt % of elemental selenium (e.g., $Se_8$, polymeric selenium).

In some embodiments, the sulfur monomers are polymerized with the one or more comonomers via free radical polymerization, controlled radical polymerization, ring-opening polymerization, ring-opening metathesis polymerization, step-growth polymerization, or chain-growth polymerization. In preferred embodiments, polymerizing the comonomers with the sulfur monomers enables at least one functional sulfur moiety of the sulfur monomers to bond with at least one functional moiety of the one or more monomers.

Consistent with previous embodiments of the sulfur copolymer, the one or more comonomers may be amine comonomers, thiol comonomers, sulfide comonomers, alkynylly unsaturated comonomers, epoxide comonomers, nitrone comonomers, aldehyde comonomers, ketone comonomers, thiirane comonomers, ethylenically unsaturated comonomers, styrenic comonomers, vinylic comonomers, methacrylate comonomers, acrylonitrile comonomers, allylic monomers, acrylate monomers, vinylpyridine monomers, isobutylene monomers, maleimide monomers, norbornene monomers, monomers having at least one vinyl ether moiety, or monomers having at least one isopropenyl moiety.

In yet other embodiments, the sulfur copolymer may further comprise one or more termonomers. In some embodiments, the termonomers may be a vinyl monomer, an isopropenyl monomer, an acryl monomer, a methacryl monomer, an unsaturated hydrocarbon monomer, an epoxide monomer, a thiirane monomer, an alkynyl monomer, a diene monomer, a butadiene monomer, an isoprene monomer, a norbornene monomer, an amine monomer, a thiol monomer, a sulfide monomer, an alkynylly unsaturated monomer, a nitrone monomer, an aldehyde monomer, a ketone monomer, an ethylenically unsaturated monomer, or a styrenic monomer. The termonomers may be present in an amount ranging from about 5 to 50 wt % of the sulfur copolymer.

In still other embodiments, the sulfur copolymer may further comprise one or more polyfunctional monomers, such as for example, a polyvinyl monomer, a polyisopropenyl monomer, a polyacryl monomer, a polymethacryl monomer, a polyunsaturated hydrocarbon monomer, a polyepoxide monomer, a polythiirane monomer, a polyalkynyl monomer, a polydiene monomer, a polybutadiene monomer, a polyisoprene monomer, a polynorbornene monomer, a polyamine monomer, a polythiol monomer, a polysulfide monomer, a polyalkynylly unsaturated monomer, a polynitrone monomer, a polyaldehyde monomer, a polyketone monomer, or a polyethylenically unsaturated monomer. The polyfunctional monomers may be present in an amount ranging from about 5 to 50 wt % of the sulfur copolymer.

In some embodiments, the print material may be dispensed through a dispenser of the 3D printer. The dispenser may comprise a heated nozzle and the print material is supplied to the heated nozzle in a solid state and dispensed from the heated nozzle in a generally liquid state. In other embodiments, the step of dispensing said print material may comprise extruding said print material to form a filament, melting the filament in a dispenser of the 3D printer, and depositing the molten material in successive layers to produce the substrate.

In other embodiments, the print material is a form of a liquid, gel, or powder. In some embodiments, the method of producing a substrate may further comprise dispensing a binding material, such as water, an adhesive, or a resin, to each layer of print material. In other embodiments, the method of producing a substrate may further comprise activating the print material via thermal, chemical, thermochemical, or photo/light activation, thereby hardening the print material to form the substrate. In some other embodiments, the print material may be activated by IR photo-heating or photo-patterning to harden the print material. In one embodiment, an IR laser can be used to shape the 3D substrate of print material.

According to some embodiments, the substrate produced from the print material is substantially transparent in an infrared or visible spectrum. For instance, the substrate may be substantially transparent in a spectrum having a wavelength range of about 1000-1500 nm, or 1500-3000 nm, or about 3000-5000 nm, or about 5-10 microns. Preferably, the sulfur copolymer can be formed into a substantially transparent substrate, such as a film, a lens, or a free-standing object. In another embodiment, the substrate may be an optical device component, such as a lens, a window, a microlens array, a waveguide, a Bragg reflector, or an optical fiber, configured for use as a transmitting material in an infrared imaging device.

According to another embodiment, the present invention features a print material comprising a liquid polysulfide, a liquid chalcogenide polymer, or oligomer containing sulfur or selenium units, which is synthesized to incorporate photocurable moieties such as vinyl, epoxide, azide, cinnamate, coumarin, benzophenone and other unsaturated moieties. These functional photocurable liquid polymers can be 3D printed via stereolithography. For example, the liquid polymers are photopolymerized upon exposure to UV or visible irradiation through a nozzle/syringe feed, or through a transparent monomer reservoir with an external light source, to prepare high refractive index polymers ($n \geq 1.75$).

As known to one of ordinary skill in the art, stereolithography is a 3D printing process where an excess of liquid polymer is photocured or hardened to form a solid substrate. For example, a UV laser may be used to "print", i.e. cure, each cross-sectional layer of the substrate. The UV laser selectively traces each cross-section, which bonds to the hardened section beneath it. This process is repeated until the entire substrate has been formed. In some embodiments, the completed substrate may be further cured in a UV oven. In other embodiments, the liquid polymer may be photocured, hardened, or activated by IR photo-heating or photo-patterning to form the 3D substrate. An IR laser can be used to activate and shape/form the 3D substrate.

Accordingly to some embodiments, the present invention features a method of producing a substrate using 3D printing, comprising providing a liquid print material comprising a sulfur copolymer having photocurable moieties, adding said liquid print material into a reservoir, and selectively photopolymerizing said print material in the reservoir to produce the substrate. Preferably, the photocurable moieties enable photopolymerization of said print material. Even more preferably, the substrate produced from the print material has a refractive index of about 1.75-2.6 at a wavelength in a range of about 500 nm to about 8 µm.

In some embodiments, the sulfur copolymer may be any of the sulfur copolymers described herein. For example, the sulfur copolymer may comprise a liquid polysulfide, a liquid chalcogenide polymer, cyclic selenium sulfide, an oligomer containing sulfur, or an oligomer containing sulfur and selenium units, copolymerized with the one or more monomers.

In one embodiment, the photocurable moieties of the sulfur copolymer may be vinyl, epoxide, azide, cinnamate, coumarin, benzophenone, or other unsaturated moieties. In some embodiments, the print material is photopolymerized upon exposure to UV or visible irradiation. In other embodiments, the print material is selectively photopolymerized in layers.

According to another embodiment, the present invention features a print material for 3D printing. The print material may comprise a sulfur copolymer. In some embodiments, the sulfur copolymer may comprise one or more chalcogenic monomers at a level of at least 50 wt % of the sulfur copolymer, and one or more comonomers at a level in the range of about 5-50 wt % of the sulfur copolymer. In preferred embodiments, the chalcogenic monomers may comprise at least sulfur units. In other preferred embodiments, the chalcogenic monomers may comprise sulfur and selenium units. For instance, the chalcogenic monomers may comprise elemental sulfur, liquid polysulfide, cyclic selenium sulfide and isomers thereof, oligomers containing sulfur, or oligomers containing sulfur and selenium units. In some embodiments, the oligomer containing sulfur and selenium units may be derived from elemental sulfur and elemental selenium (e.g., $Se_8$, polymeric selenium). In one embodiment, the sulfur copolymer may comprise at least about 30 wt % of sulfur. In another embodiment, the sulfur copolymer may comprise at least about 30 wt % of elemental selenium.

In another embodiment, the print material may comprise a sulfur copolymer comprising one or more cyclic selenium sulfide monomers having the formula $Se_nS_{(8-n)}$, and one or more comonomers In some embodiments, the cyclic selenium sulfide monomers comprises at most about 70 wt % of selenium. In some embodiments, n in an integer ranging from 1 to 7. In other embodiments, the one or more comonomers are at a level in the range of about 5-50 wt % of the sulfur copolymer. In other embodiments, at least one functional sulfur moiety of the selenium-sulfide is bonded to at least one functional moiety of the one or more monomers. In one embodiment, the sulfur copolymer may further comprise one or more sulfur monomers derived from elemental sulfur ($S_8$), at a level of about 5-50 wt % of the sulfur copolymer. In another embodiment, the sulfur copolymer may further comprise elemental selenium (e.g., $Se_8$, polymeric selenium), at a level of about 5-50 wt % of the sulfur copolymer.

According to some embodiments, the print material may comprise a sulfur copolymer comprising one or more sulfur monomers derived from elemental sulfur at a level of at least 30 wt % of the sulfur copolymer, elemental selenium (e.g., $Se_8$, polymeric selenium) at a level of at least 30 wt % of the sulfur copolymer, and one or more comonomers at a level in the range of about 5-50 wt % of the sulfur copolymer. In one embodiment, the sulfur copolymer may comprise at least about 50 wt % sulfur monomers. In another embodiment, the sulfur copolymer may comprise at least about 50 wt % of elemental selenium. In an exemplary embodiment, the sulfur copolymer may comprise about 30-50 wt % of sulfur monomers, about 30-50 wt % of elemental selenium, and about 15-25 wt % of the comonomers, such as diisopropenylbenzene.

According to other embodiments, the print material may comprise a sulfur copolymer comprising one or more sulfur monomers derived from elemental sulfur at a level of at least 30% wt of the sulfur copolymer, and one or more comonomers at a level in the range of about 5-50 wt % of the sulfur copolymer. In some embodiments, the sulfur monomers may be at least about 50 wt %. In other embodiments, the sulfur copolymer may further comprise at least about 30 wt %, or at least about 40 wt %, or at least about 50 wt % of elemental selenium (e.g., Se$, polymeric selenium).

According to yet other embodiments, the print material may comprise a sulfur copolymer having photocurable moieties that enable photopolymerization of said print material. The sulfur copolymer may be a liquid polysulfide, a liquid chalcogenide polymer, cyclic selenium sulfide, an oligomer containing sulfur, or an oligomer containing sulfur and selenium units, copolymerized with the one or more monomers. The photocurable moieties of the sulfur copolymer may be vinyl, epoxide, azide, cinnamate, coumarin, benzophenone, or other unsaturated moieties.

Consistent with previous embodiments of the print material, the one or more comonomers may be amine comonomers, thiol comonomers, sulfide comonomers, alkynylly unsaturated comonomers, epoxide comonomers, nitrone comonomers, aldehyde comonomers, ketone comonomers, thiirane comonomers, ethylenically unsaturated comonomers, styrenic comonomers, vinylic comonomers, methacrylate comonomers, acrylonitrile comonomers, allylic monomers, acrylate monomers, vinylpyridine monomers, isobutylene monomers, maleimide monomers, norbornene monomers, monomers having at least one vinyl ether moiety, or monomers having at least one isopropenyl moiety.

In one embodiment, the sulfur copolymer may further comprise one or more termonomers at about 5 to 50 wt % of the sulfur copolymer. Examples of termonomers include, but are not limited to, a vinyl monomer, an isopropenyl monomer, an acryl monomer, a methacryl monomer, an unsaturated hydrocarbon monomer, an epoxide monomer, a thiirane monomer, an alkynyl monomer, a diene monomer, a butadiene monomer, an isoprene monomer, a norbornene monomer, an amine monomer, a thiol monomer, a sulfide monomer, an alkynylly unsaturated monomer, a nitrone monomer, an aldehyde monomer, a ketone monomer, an ethylenically unsaturated monomer, or a styrenic monomer.

In another embodiment, the sulfur copolymer may further comprise one or more polyfunctional monomers at about 5 to 50 wt % of the sulfur copolymer. Examples of polyfunctional monomers include, but are not limited to, a polyvinyl monomer, a polyisopropenyl monomer, a polyacryl monomer, a polymethacryl monomer, a polyunsaturated hydrocarbon monomer, a polyepoxide monomer, a polythiirane monomer, a polyalkynyl monomer, a polydiene monomer, a polybutadiene monomer, a polyisoprene monomer, a polynorbornene monomer, a polyamine monomer, a polythiol monomer, a polysulfide monomer, a polyalkynylly unsaturated monomer, a polynitrone monomer, a polyaldehyde monomer, a polyketone monomer, and a polyethylenically unsaturated monomer.

In preferred embodiments, the print material is formed into a substantially transparent substrate via 3D printing. The transparent substrate can be a film, a lens, or a freestanding object. Alternatively, the substrate may an optical device component configured for use as a transmitting material in an infrared imaging device, such as for example, a lens, a window, a microlens array, a waveguide, a Bragg reflector, or an optical fiber. In preferred embodiments, the substrate has a refractive index of about 1.75-2.6 at a wavelength in a range of about 500 nm to about 8 μm. In yet other embodiments, the print material is self-healing upon thermal reprocessing.

In some embodiments, the substrate produced from the print material is substantially transparent in an infrared or visible spectrum. In other embodiments, the substrate produced from the print material is substantially transparent in a spectrum having a wavelength range of about 1000-1500 nm. In yet other embodiments, the substrate produced from the print material is substantially transparent in a spectrum having a wavelength range of about 3000-5000 nm. In further embodiments, the substrate produced from the print material is substantially transparent in a spectrum having a wavelength range of about 5-10 microns.

According to another embodiment, the invention features a method of making an optical substrate. The method may comprise 3D printing said optical substrate using any of the print material described herein. In preferred embodiments, the optical substrate is substantially transparent and has a refractive index of about 1.75-2.6 at a wavelength in a range of about 500 nm to about 8 μm.

According to another embodiment, the present invention features a method of preparing a print material for use in a 3D printer. The method may comprise preparing a sulfur copolymer, and forming the sulfur copolymer to the print material in a form suitable for use in the 3D printer.

In some embodiments, the step of preparing the sulfur copolymer may comprise providing at least 50 wt % of chalcogenic monomers, heating the cyclic chalcogenic monomers to form a liquid chalcogenic solution, adding about 5-50 wt % of one or more comonomers to the liquid chalcogenic solution, and polymerizing the comonomers with the liquid chalcogenic solution to form the sulfur copolymer. In other embodiments, the step of preparing the sulfur copolymer further comprises heating the sulfur copolymer until the sulfur copolymer is substantially vitrified.

In some embodiments, the chalcogenic monomers may comprise at least sulfur units. In other embodiments, the chalcogenic monomers may comprise sulfur and selenium units. For instance, the chalcogenic monomers may comprise elemental sulfur, liquid polysulfide, cyclic selenium sulfide and isomers thereof, oligomers containing sulfur, or oligomers containing sulfur and selenium units. In some embodiments, the oligomer containing sulfur and selenium units may be derived from elemental sulfur and elemental selenium (e.g., $Se_8$, polymeric selenium). In one embodiment, the sulfur copolymer may comprise at least about 30 wt % of sulfur. In another embodiment, the sulfur copolymer may comprise at least about 30 wt % of elemental selenium.

In some other embodiments, the step of preparing the sulfur copolymer may comprise providing cyclic selenium sulfide having the formula $Se_nS_{(8-n)}$, wherein the cyclic selenium sulfide monomers comprises at most about 70 wt % of selenium, heating the cyclic selenium sulfide to form a liquid selenium sulfide, adding about 5-50 wt % of one or more comonomers to the liquid selenium sulfide, and polymerizing the comonomers with the liquid selenium sulfide to form the sulfur copolymer. In other embodiments, the step of preparing the sulfur copolymer further comprises heating the sulfur copolymer until the sulfur copolymer is substantially vitrified.

In some embodiments, n in an integer that can range from 1 to 7. For example, when n=2, the cyclic selenium sulfide can have the formula $Se_2S_6$. As another example, when n=3, the cyclic selenium sulfide can have the formula $Se_3S_5$. Preferably, the cyclic selenium sulfide can comprise all possible isomers of a specific formula. In alternative embodiments, the selenium sulfide can be of the formula $Se_nS_m$, wherein n ranges from 1 to 7 and m ranges from 1 to 7, wherein the selenium sulfide are not necessarily cyclic.

In other embodiments, the step of producing the sulfur copolymer may further comprise adding about 5-50 wt % of elemental sulfur to the cyclic selenium sulfide prior to adding the comonomers. In yet other embodiments, the step of producing the sulfur copolymer may further comprise adding about 5-50 wt % of elemental selenium to the cyclic selenium sulfide prior to adding the comonomers.

According to some embodiments, the step of preparing the sulfur copolymer may comprise providing at least 30 wt % of elemental sulfur, heating the elemental sulfur to form molten sulfur, adding at least 30 wt % of elemental selenium (e.g., $Se_8$, polymeric selenium) to the molten sulfur to form a liquid selenium sulfur mixture, adding about 5-50 wt % of one or more comonomers to the liquid selenium sulfur mixture, and polymerizing the comonomers with the liquid selenium sulfur mixture to form the sulfur copolymer. In one embodiment, the step of preparing the sulfur copolymer may further comprise heating the sulfur copolymer until the sulfur copolymer is substantially vitrified. In another embodiment, the step of preparing the sulfur copolymer comprises providing at least about 50 wt % of elemental sulfur. In yet another embodiment, the step of preparing the sulfur copolymer comprises adding at least about 50 wt % of elemental selenium. In a further embodiment, the sulfur copolymer may comprise about 30-50 wt % of elemental sulfur, about 30-50 wt % of elemental selenium, and about 15-25 wt % of the comonomers.

According to other embodiments, the step of preparing the sulfur copolymer may comprise providing at least about 30 wt % elemental sulfur, melting the elemental sulfur to form a molten sulfur, adding about 5-50 wt % of one or more comonomers to the molten sulfur, and polymerizing the comonomers with the molten sulfur to form the sulfur copolymer. In some embodiments, the step of preparing the sulfur copolymer may further comprise heating the sulfur copolymer until the sulfur copolymer is substantially vitrified. In other embodiments, the step of preparing the sulfur copolymer comprises providing at least about 50 wt % of elemental sulfur. In still other embodiments, the step of preparing the sulfur copolymer may further comprise adding at least about 30 wt %, or about 40 wt %, or about 50 wt % of elemental selenium prior to adding the comonomers.

Consistent with previous embodiments of preparing the sulfur copolymer, the one or more comonomers may be amine comonomers, thiol comonomers, sulfide comonomers, alkynylly unsaturated comonomers, epoxide comonomers, nitrone comonomers, aldehyde comonomers, ketone comonomers, thiirane comonomers, ethylenically unsaturated comonomers, styrenic comonomers, vinylic comonomers, methacrylate comonomers, acrylonitrile comonomers, allylic monomers, acrylate monomers, vinylpyridine monomers, isobutylene monomers, maleimide monomers, norbornene monomers, monomers having at least one vinyl ether moiety, or monomers having at least one isopropenyl moiety.

In some embodiments, the sulfur copolymer is prepared such that available photocurable moieties are incorporated into the sulfur copolymer. The photocurable moieties may be vinyl, epoxide, azide, cinnamate, coumarin, benzophenone, or other unsaturated moieties.

Examples of techniques of polymerizing include, but are not limited to, free radical polymerization, controlled radical polymerization, ring-opening polymerization, ring-opening metathesis polymerization, step-growth polymerization, and chain-growth polymerization.

In other embodiments, the step of preparing the sulfur copolymer may further comprise polymerizing the sulfur copolymer with one or more termonomers. The one or more termonomers can be a vinyl monomer, an isopropenyl monomer, an acryl monomer, a methacryl monomer, an unsaturated hydrocarbon monomer, an epoxide monomer, a thiirane monomer, an alkynyl monomer, a diene monomer, a butadiene monomer, an isoprene monomer, a norbornene monomer, an amine monomer, a thiol monomer, a sulfide monomer, an alkynylly unsaturated monomer, a nitrone monomer, an aldehyde monomer, a ketone monomer, an ethylenically unsaturated monomer, or a styrenic monomer. The termonomers may be present in an amount ranging from about 5 to 50 wt % of the sulfur copolymer.

In still other embodiments, the step of preparing the sulfur copolymer may further comprise polymerizing the sulfur copolymer with one or more polyfunctional monomers. The one or more polyfunctional monomers can be a polyvinyl monomer, a polyisopropenyl monomer, a polyacryl monomer, a polymethacryl monomer, a polyunsaturated hydrocarbon monomer, a polyepoxide monomer, a polythiirane monomer, a polyalkynyl monomer, a polydiene monomer, a polybutadiene monomer, a polyisoprene monomer, a polynorbornene monomer, a polyamine monomer, a polythiol monomer, a polysulfide monomer, a polyalkynylly unsaturated monomer, a polynitrone monomer, a polyaldehyde monomer, a polyketone monomer, or a polyethylenically unsaturated monomer. The polyfunctional monomers may be present in an amount ranging from about 5 to 50 wt % of the sulfur copolymer.

In some embodiments, the step of forming the sulfur copolymer may comprise extruding the sulfur copolymer such that the print material is in the form of filaments. In other embodiments, the step of forming the sulfur copolymer comprises grinding the sulfur copolymer such that the print material is in the form of a powder. In further embodiments, the step of forming the sulfur copolymer comprises liquefying, i.e. dissolving in a solvent or melting, the sulfur copolymer such that the print material is in the form of a gel or liquid.

According to some embodiments, the print material can be formed into a substantially transparent substrate, such as a film, a lens, or a free-standing object, via 3D printing. The substrate may be substantially transparent in an infrared or visible spectrum. For instance, the substrate may substantially transparent in a spectrum having a wavelength range of about 1000-1500 nm, or 1500-3000 nm, or about 3000-5000 nm, or about 5-10 microns. In another embodiment, the print material can be fabricated into an optical device component via 3D printing for use as a transmitting material in an infrared imaging device. The optical device component can be a lens, a window, a microlens array, a waveguide, a Bragg reflector, or an optical fiber.

According to another embodiment, a thermoplastic form of the sulfur containing polymer as described herein may be pre-processed into a fibrous form that is then 3D printed via fused filament modelling into free standing substrates. Examples of said free standing substrates include, but are not limited to, optic substrates, optical components and optical devices such as lenses, windows, fibers, waveguides, microlens arrays, and Bragg reflectors.

In some embodiments, the sulfur copolymer is a thermoset. In some embodiments, the sulfur copolymer is a thermoplastic. In some embodiments, the sulfur copolymer is self-healing. In some embodiments, when one or more S—S bonds of the sulfur copolymer are broken, the S—S bonds are reconnected by thermal reforming.

In some embodiments, the present invention may feature a method of repairing an optical substrate, said method comprising providing the optical substrate comprising a sulfur copolymer having one or more broken S—S bonds, and heat treating the optical substrate at a healing temperature for a period of time in order to reconnect the S—S bonds of the sulfur copolymer. In some embodiments, the healing temperature is between about 80° C. and 100° C. In other embodiments, the healing temperature is between about 100° C. and 150° C. In some embodiments, the healing temperature is at or near the melting point of the polymeric substrate. In some embodiments, the period of time is between about 4 and 15 hours. In other embodiments, the period of time is between about 8 and 12 hours.

Sulfur Copolymers as Optical Waveguides

The optical waveguides as described in the present invention can utilize any of the sulfur copolymers described herein. One embodiment of the optical waveguides may use a copolymer comprising: sulfur and any one or more of the comonomers described herein such as, for example, sulfur and selenium; sulfur and selenium sulfides; sulfur, selenium, and any one or more of the comonomers described herein; sulfur and norbornene; or sulfur, selenium, and norbornene. However, the optical waveguides are not limited to these examples and can use any copolymers that would provide the desired optical properties. The optical properties may include, but are not limited to, high refractive index (n>1.5) and transparency in the infrared regime.

The sulfur copolymers described herein can be partially cured to provide a more easily processable material, which can be processed into a desired form (e.g., into a desired shape, such as in the form of a free-standing shape or a device), then fully cured in a later operation. For example, one embodiment of the invention is a method of making an article formed from the sulfur polymers as described herein. The method includes heating the sulfur polymer at a temperature in the range of about 120° C. to about 220° C. (e.g. 120° C. to about 150° C.) to form a prepolymer; forming the prepolymer into the shape of the article, to yield a formed prepolymer shape; and further heating the formed prepolymer shape to yield the article. The prepolymer can be formed, for example, by conversion of the one or more monomers at a level in the range of about 20 to about 50 mol %. For example, heating the sulfur polymer to form the prepolymer can be performed for a time in the range of about 20 seconds to about five minutes, for example, at a temperature in the range of about 175° C. to about 195° C. In one embodiment, the heating is performed for less than about 2 minutes at about 185° C. The person of skill in the art will determine the desired level of monomer conversion in the prepolymer stage to yield a processable prepolymer material, and will determine process conditions that can result in the desired level of monomer conversion.

In one embodiment, the prepolymer can be provided as a mixture with a solvent for forming, e.g., via casting, molding or printing. The prepolymers described herein can form miscible mixtures or solutions with a variety of nonpolar high-boiling aromatic solvents, including, for example, haloarene solvents such as di- and trichlorobenzene (e.g., 1,2,4-trichlorobenzene). The solvent can be added, for example, after the prepolymer is prepared, to provide a softened or flowable material suitable for a desired forming step (e.g., casting, molding, or spin-, dip- or spray-coating.) In some embodiments, the prepolymer/solvent mixture can be used at elevated temperatures (e.g., above about 100° C., above about 120° C. or above about 140° C.) to improve flow at relatively low solvent levels (e.g., for use in casting or molding processes). In other embodiments, the prepolymer/solvent mixture can be used at a lower temperature, for example, at ambient temperatures. The prepolymers described herein can remain soluble even after the solvent cools.

In one embodiment, the prepolymer is coated and cured as a film on a substrate. While $S_8$ is typically intractable due to its crystallinity, the materials described herein can be formed as to be amenable to solution processing (e.g., in molten or solvent-admixed form) to fabricate thin film materials. Mixtures of molten prepolymer and solvent can be diluted to the concentration desired for a given spin-coating process.

When forming thin films of the materials described herein on substrates, it can often be desirable to use a polyimide primer layer. Thus, a solution of a polyamic precursor (e.g., polypyromellitamic acid-4,4'-dianiline, or compounds with oxyaniline linkages), or similar polymer derivatives can be deposited onto a substrate and cured (e.g., by heating at a temperature in the range of about 120 to about 220° C.) to form a thin polyimide layer (e.g., as thin as 2 nm), upon which the materials described herein can be formed. Moreover, in many embodiments, even fully cured polymers as described herein can be melt-processed or suspended or dissolved in solvent and deposited on to substrates in a manner similar to those described for prepolymeric materials.

In certain embodiments, the prepolymer can be shaped and cured using a mold. For example, in one embodiment, the prepolymer (i.e., in liquid or solvent-admixed form) can be deposited (e.g., by pouring) into a TEFLON or silicone (e.g., polydimethylsiloxane (PDMS)) mold, then cured to form a desired shape. In another embodiment, a softened prepolymer material (e.g., swollen with solvent and/or softened by heat) can be imprinted by stamping with a mold bearing the desired inverse surface relief, then cured and allowed to cool. Moreover, in many embodiments, even fully cured copolymers as described herein can be shaped with a mold in a manner similar to those described for prepolymeric materials. Sulfur terpolymers and more complex polymer materials, such as in the form of cross-linked polymers, or non-crosslinked, intractable polymers, can be reprocessed by thermal or other stimuli activation of dynamic S—S bonds in the polymer system.

As described above, soluble sulfur polymers can be made by the person of skill in the art, for example, using relatively higher fractions of organic monomer(s). Such polymers can be solution processed to fabricate articles. For example, another aspect of the invention is a method of forming an article formed from a sulfur polymer as described herein, the method comprising admixing the sulfur polymer with a nonpolar organic solvent (e.g., to make a suspension or solution), forming the admixed sulfur polymer into the shape of the article, and removing the solvent from the sulfur polymer to yield the article. The admixture with solvent can, for example, dissolve the sulfur polymer. Various process steps can be performed at elevated temperatures, for example, to decrease viscosity of the admixed sulfur polymer and to aid in evaporation of solvent.

For example, in one embodiment, a room temperature solution of any sulfur polymer described herein (e.g., in prepolymeric form) is poured into a TEFLON or PDMS mold. A decrease in viscosity at elevated temperatures (e.g., >about 140° C.) can allow sufficient flow into even intricate mold shapes. Once the mold is filled, it can be placed in a vacuum oven at increased temperature (e.g., about 210° C.) under ambient pressure to cure and to drive off solvent. For thicker molded samples, vacuum can be pulled on the solution when it is in a low viscosity state in order to ensure the removal of bubbles. The mold is then removed from the oven and allowed to cool before removal from the mold.

According to other embodiments, the sulfur copolymers described herein may be used to form an optical element. In some embodiments, the sulfur copolymers may be formed as a substantially optically transparent body having a refractive index in the range of about 1.7 to about 2.6 and at least one wavelength in the range of about 500 nm to about 10 µm. For example, the optical substrate may be a substantially transparent optical body, such as a film, a lens, or a free-standing object. Preferably, the optical substrate has an optical transparency in the visible and infrared spectrum.

In some embodiments, the present invention features a method of repairing an optical substrate, said method comprising providing the optical substrate comprising any of the sulfur copolymers described herein, the sulfur copolymers having one or more broken S—S bonds, and heat treating the optical substrate at a healing temperature for a period of time in order to reconnect the S—S bonds of the sulfur copolymers. In some embodiments, the healing temperature is about 80° C. and 100° C. or alternatively, about 100° C. and 150° C. In some embodiments, the healing temperature is at or near the melting point of the polymeric substrate. In some embodiments, the period of time is between about 4 and 15 hours. In some embodiments, the period of time is between about 8 and 12 hours. For illustrative purposes, a thermal reforming procedure for a self-healing optical substrate may comprise placing an optical substrate having a crack in an oven and heating the optical substrate at a temperature of about 100° C. for about 3 hours. The optical substrate can be inspected to ensure that it is completely self-healed.

One aspect of the invention pertains to a method comprising using high refractive index polymers based on CHIPs as a photoresponsive medium.

In one embodiment, the present invention features a photoresponsive medium comprising one or more the sulfur copolymers described herein. A non-limiting example includes a photoresponsive medium that changes its refractive index upon the application of ultraviolet radiation at wavelengths between 350-400 nm. In some embodiments, the change to the refractive index is irreversible. In one embodiment, the photoexposed region of the photoresponsive medium is characterized by a refractive index that is about 0.01-0.08 lower than that of the exposed region. In other embodiments, the photoexposed region of the photoresponsive medium is characterized by a refractive index that is about 0.01-0.05 lower than that of the exposed region. In other embodiments, the one or more sulfur copolymers have a content of selenium atoms and sulfur-selenium bonds in the polymer (10-75 wt % Se) with unsaturated organic, inorganic, or hybrid comonomers ranging from 10-90 wt %, where the S—S or Se—S bonds are also stimuli-responsive and able to form crosslinked films by exposure to heat, mechanical stress or light.

In other embodiments, the present invention features a method of preparing a photopatterned, unstructured polymer thin film. The method comprises depositing onto a substrate the unstructured polymer film comprising one or more sulfur copolymers and exposing said film to ultraviolet radiation to form an exposed sulfur copolymer film. In further embodiments, the exposed sulfur copolymer film has a thickness ranging from 10 nm to 20 µm. In some embodiments, the film is prepared by a photopatterning method comprising selectively crosslinking by photoirradiation with ultraviolet light through a photomask or via a maskless lithography process with feature sizes of the photopatterned sulfur copolymers ranging from 10 nm to 100 µm.

In other embodiments, the present invention features an optical waveguide fabricated by a method comprising solution processing of sulfur copolymers to form a thin film deposited on a substrate, photopatterning the film, and optionally adding a top layer to form an optical waveguide. In further embodiments, the waveguide is capable of transmitting infrared radiation through the sulfur copolymer film. In some embodiments, the waveguide can be used in a photonic device or a waveguide device. Examples of the waveguide device include, but are not limited to, an integrated splitter, coupler, arrayed waveguide grating, phase-shifter, Mach-Zehnder interferometer, directional coupler, microring resonator, or a mode converter. In some embodiments, the method of fabricating the optical waveguide comprises solution processing of the sulfur copolymer into thin films, and photopatterning the film.

In some embodiments, the present invention features a multilayer device comprising at least one layer of a chalcogenide-based polymer (e.g. a CHIP material), The device comprises: 1) at least a portion of the area of the layer which has been photoexposed by a method comprising using a mask or a maskless lithography system to create a photopattern which comprises an unexposed region and a photoexposed region, thereby fabricating at least one layer of said polymer so as to create an optical waveguide, where the photoexposed region results in crosslinking of the polymer (or CHIP material), rendering the region insoluble in solvents that can rinse away the uncured polymer (or material), resulting in a physically defined waveguide; and 2) an optical waveguide made using the method (1). In further embodiments, the chalcogenide-based polymer is poly(S-r-CHIP). In one embodiment, the CHIP has a content of selenium atoms and sulfur-selenium bonds in the polymer (10-75 wt % Se) with unsaturated organic, inorganic, or hybrid comonomers ranging from 10-90 wt %, where the S—S or Se—S bonds are also stimuli-responsive and able to form crosslinked films by exposure to heat, mechanical stress or light.

In one embodiment, the present invention features a multilayer device including a layer of chalcogenide-based polymer (e.g. a CHIPs material). The device comprises: 1) at least a portion of the area of the layer which has been photoexposed by a method comprising: a) using mask or with a maskless lithography system to create a photopattern; and b) fabricating 2-6 layers of said polymer (or material) and disposing said layers so as to create an optical waveguide for a CHIP waveguide core, where photoexposed regions result in crosslinking of the polymer (e.g. CHIPs material), rendering said layers insoluble in solvents that can rinse away the uncured material, resulting in a physically defined waveguide core; and 2) an optical waveguide made using the method from (1). In further embodiments, the chalcogenide-based polymer is poly(S-r-CHIP). In some embodiments, the CHIP has a content of selenium atoms and sulfur-selenium bonds in the polymer (10-75 wt % Se) with unsaturated organic, inorganic, or hybrid comonomers ranging from 10-90 wt %, where the S—S or Se—S bonds are also stimuli-responsive and able to form crosslinked films by exposure to heat, mechanical stress or light.

In yet another embodiment, the present invention features a multilayer device. The device comprises: 1) at least a portion of the area of the layer which has been photoexposed by a method comprising using mask or a maskless lithography system to create a photopattern which comprises an unexposed region and a photoexposed region, thereby fabricating at least one layer of said polymer so as to create an optical waveguide, where the photoexposed region results in crosslinking of the polymer (or CHIP material), rendering said region insoluble in solvents that can rinse away the uncured material, resulting in a physically defined waveguide core; and 2) an optical waveguide made using the method (1). In some embodiments, the CHIP has a content of selenium atoms and sulfur-selenium bonds in the polymer (10-75 wt % Se) with unsaturated organic, inorganic, or hybrid comonomers ranging from 10-90 wt %, where the S—S or Se—S bonds are also stimuli-responsive and able to form crosslinked films by exposure to heat, mechanical stress or light.

In one embodiment, the photoexposed region in any of the devices described herein is characterized by a refractive index up to 1 lower than that of the unexposed region. In other embodiments, the solvent used to rinse away the uncured material in any of the devices described herein is an organic solvent. Examples of organic solvents include but are not limited to, alcohols, such as methanol or ethanol; aldehydes such as acetone; aromatics solvents, such as benzene, toluene, chlorobenzene, or dicholorobenzene; non-polar aprotic solvents, such as tetrahydrofuran or dichloromethane; and other organic solvents known in the art.

In some embodiments the invention encompasses a method comprising directly photopatterning unstructured polymer thin films of CHIPs based on poly(sulfur-random-(1,3-diisopropenylbenzene) (abbreviated to poly(S-r-DIB) by exposure with ultraviolet radiation with any development, or solvent washing steps. By irradiation through various photomasks available through standard photography methods, arbitrary patterns may be directly photopatterned into thin films. Inventors also surprisingly discovered that a reduction in the refractive index in photoexposed regions on the order of $10^{-2}$ refractive index units, which enables direct fabrication of optical waveguide architectures and devices.

Another aspect of the invention is directed to a photoresponsive medium comprising one or more CHIPs. Without wishing to limit the invention to a particular theory, the CHIPs photoresponsive medium has the property of changing its refractive index upon the application of certain wavelengths of radiation, preferably in the ultraviolet between 350-400 nm, with the amount of refractive index change proportional to the duration of the illumination.

In some embodiments, the invention encompasses a method of preparing a photopatterned, unstructured polymer thin film, said method comprising photopatterning unstructured polymer thin films of one or more CHIPs based on poly(sulfur-random-(1,3-diisopropenylbenzene) (poly(S-r DIB) by exposure with ultraviolet radiation without any development, or solvent washing steps to obtain a refractive index contrast in the polymer.

Without wishing to limit the present invention, this is the first discovery of photopatterning with CHIPs materials and is a useful technological advance for optical photonics using inexpensive, solution processable CHIPs materials.

In some embodiments, the invention encompasses an interactive label that can be scanned by a smart device (such as a smartphone) comprising a photoresponsive medium of the invention.

In further embodiments, the invention encompasses a film comprising a photoresponsive medium of the invention. In some embodiments, this film may be used in an interactive label.

In some embodiments, the invention encompasses a multilayer device comprising at least one layer of chalcogenide-based polymer (e.g. a CHIP material), wherein said device comprises: 1) at least a portion of the area of the layer which has been photoexposed by a method comprising using a mask or a maskless lithography system to create a photopattern, which comprises an unexposed region and a photoexposed region, thereby fabricating at least one layer of said polymer so as to create an optical waveguide, where said photoexposed region results in crosslinking of the polymer (or CHIP material), rendering said photoexposed region insoluble in solvents that can rinse away the uncured material (or polymer), resulting in a physically defined waveguide core; and 2) an optical waveguide made using said method (1).

In some embodiments, the invention encompasses a multilayer device including a layer of chalcogenide-based polymer, e.g. a CHIPs material, wherein said device comprises: 1) at least a portion of the area of the layer which has been photoexposed by a method comprising (a) using a mask or with a maskless lithography system to create a photopattern, (b) fabricating 2-6 layers of said polymer (or material), (c) and disposing said layers so as to create an optical waveguide for a CHIP waveguide core, where photoexposed regions results in crosslinking of the polymer (e.g. CHIPs material), rendering said regions insoluble in solvents that can rinse away the uncured polymer (or material), resulting in a physically defined waveguide core; and 2) An optical waveguide made using A.

In further embodiments, the invention encompasses multilayer device comprising at least one layer of poly(S-r-CHIP), wherein said device comprises: (A) at least a portion of the area of the layer which has been photoexposed by a method comprising using a mask or a maskless lithography system to create a photopattern, which comprises an unexposed region and an photoexposed region, thereby fabricating at least one layer of said polymer so as to create an optical waveguide, where said photoexposed regions result in crosslinking of the polymer (or CHIP material), rendering said regions insoluble into solvents that can rinse away the uncured material (or polymer), resulting in a physically defined waveguide core; and (B) An optical waveguide made using said method (A).

In further embodiments, the invention encompasses a multilayer device comprising at least one layer of poly(S-r-CHIP), wherein said device comprises: (A) at least a portion of the area of the layer which has been photoexposed by a method comprising using a mask or a maskless lithography system to create a photopattern, which comprises an unexposed region and a photoexposed region, thereby fabricating at least one layer of said polymer so as to create an optical waveguide, where said photoexposed region results in crosslinking of the polymer (or CHIP material), rendering said region insoluble into solvents that can rinse away the uncured material, resulting in a physically defined waveguide core; and (B) An optical waveguide made using said method (A).

Without wishing to limit the invention to a particular theory or mechanism, when the poly(S-r-DIB) is exposed to ultraviolet radiation and any developmental- or solvent-washing step, the refractive index of the polymer is reduced. Aromatic solvents, such as, toluene, chlorobenzene, dicholorobenzene, and nonpolar aprotic solvents such as tetrahydrofuran or dichloromethane may be used in the solvent washing step. The irradiated polymer has a refractive contrast with virgin polymer that allows the material to be used for optical waveguide architectures and devices. Conventional photolithography processes, currently used in microelectronic technology, can easily be applied to this polymer, enabling its use in the thin film market.

The photoresponsive medium of the invention may be used in standard photolithography processes. As a non-limiting example, the photoresponsive medium may be used in optical packaging applications. In some embodiments, the invention encompasses an optical packaging comprising the photoresponsive medium of the invention.

In some embodiments, the photonic device is a waveguide device such as an integrated splitter, coupler, arrayed waveguide grating, or optical waveguide amplifier. In other embodiments, the polymer waveguide devices are used as optical interconnects (i.e., coupling two discrete optical elements or devices). Waveguide devices as described herein may be assembled using known methods. See e.g., U.S. Pat. No. 6,917,749.

CHIP and methods as disclosed in Int'l Appl. No. PCT/US18/25178; filed: Mar. 29, 2018 is incorporated by reference to the extent it is consistent with the aspects of the invention described herein.

The following list of embodiments are mentioned by way of example:

A photoresponsive medium comprising one or more CHIPs. The CHIPs photoresponsive medium has the property of changing its refractive index upon the application of certain wavelengths of radiation, preferably in the ultraviolet between 350-400 nm, with the amount of refractive index change proportional to the duration of the illumination.

Substrate deposited films, or thin films using CHIPs material ranging from 10 nm to 20 µm thick that can be selectively crosslinked by photoirradiation with ultraviolet light through a photomask, or via a maskless lithography process with feature sizes of the photopatterned CHIPs ranging from 10 nm to 100 µm.

A method of preparing a photopatterned, unstructured polymer thin film, said method comprising photopatterning unstructured polymer thin films of one or more CHIPs based on poly(sulfur-random-(1,3-diisopropenylbenzenexpoly (S-r DIB), or other CHIPs compositions based organic unsaturated comonomers, by exposure with ultraviolet radiation without any development, or solvent washing steps required to obtain a refractive index contrast in the polymer.

An optical waveguide fabricated by solution processing of CHIPs materials into thin films, photopatterning and developing to create a physically defined CHIPs waveguide core, with lower refractive index materials suitably disposed around the patterned CHIPs waveguide core.

A multilayer device comprising at least one layer of chalcogenide-based polymer (e.g. a CHIP material), wherein said device comprises: (A) at least a portion of the area of the layer which has been photoexposed by a method comprising using a mask or a maskless lithography system to create a photopattern, which comprises an unexposed region and an photoexposed region, thereby fabricating at least one layer of said polymer so as to create an optical waveguide, where said photoexposed region results in crosslinking of the polymer (or CHIP material), rendering said region insoluble into solvents that can rinse away the uncured material, resulting in a physically defined waveguide core; and (B) An optical waveguide made using said method (A).

A multilayer device including a layer of chalcogenide-based polymer, e.g. a CHIPs material, wherein said device comprises: (A) at least a portion of the area of the layer which has been photoexposed by a method comprising (1) using a mask or with a maskless lithography system to create a photopattern; (2) fabricating 2-6 layers of said polymer (or material); and (3) disposing said layers so as to create an optical waveguide for a CHIP waveguide core, where photoexposed regions results in crosslinking of the polymer (e.g. CHIPs material), rendering said layers insoluble into solvents that can rinse away the uncured material, resulting in a physically defined waveguide core; and (B) An optical waveguide made using the method (A).

A multilayer device comprising at least one layer of poly(S-r-CHIP), wherein said device comprises: (A) at least a portion of the area of the layer which has been photoexposed by a method comprising using a mask or a maskless lithography system to create a photopattern, which comprises an unexposed region and an photoexposed region, thereby fabricating at least one layer of said polymer so as to create an optical waveguide, where said photoexposed region results in crosslinking of the polymer (or CHIP material), rendering said region insoluble in solvents that can rinse away the uncured polymer (or material), resulting in a physically defined waveguide core; and (B) An optical waveguide made using said method (A).

EXAMPLES

The following are non-limiting examples of preparing the sulfur copolymers to demonstrate the present invention in practice, it is understood that the present invention is not limited by said examples, and that equivalents or substitutes are within the scope of the invention.

Example 1A: Preparation of 4-vinylbenzyl Glycidyl Ether

Referring to FIG. 1, to sodium hydride (4.0 g, 166 mmol) suspended in DMF (200 mL), glycidol (6.6 mL, 97 mmol) was added at 0° C. After the reaction mixture was stirred for 30 min at 0° C., vinyl benzyl chloride (7 mL, 50 mmol) was added and the mixture was stirred overnight at room temperature. Saturated aqueous ammonium chloride was added to quench the reaction and the aqueous layer was extracted with diethyl ether. The combined organic layers were dried over sodium sulfate and the solvent was removed in vacuo. The residue was purified by flash chromatography over silica gel (dichloromethane-hexanes 1:2 v/v)) to afford 4-vinylbenzyl glycidyl ether (6.2 g, 64%).

Example 1B: Sulfur-4-Vinylbenzyl Glycidyl Ether Copolymerization

Again, referring to FIG. 1, elemental sulfur (500 mg, 1.95 mmol) was added to a 4 mL glass vial equipped with a magnetic stir bar and heated at 130° C. until a clear yellow molten phase was formed. 4-vinylbenzyl glycidyl ether (500 mg, 2.57 mmol) was injected to liquid sulfur via syringe. The reaction mixture was stirred at 130° C. for 20 min yielding a dark brown glass.

Example 2A: Preparation of 4-epoxystyrene

Referring to FIG. 2, one of ordinary skill in the art will understand that when an alkene is added to mCPBA, an epoxidation reaction of the alkenes occurs to form an epoxide. For instance, divinylbenzene (10 mL, 70 mmol) was added to a stirred solution of meta-chloroperbenzoic acid (mCPBA) (12 g, 70 mmol) in 100 ml of dichloromethane at 0° C. The reaction mixture was stirred overnight at room temperature. Afterwards, the reaction mixture was filtered and the organic layer was concentrated under reduced pressure. The concentrated reaction mixture was diluted with saturated $NaHCO_3$ solution (200 mL) and extracted with diethyl ether (50 mL×3). The combined organic layers were dried over $Na_2SO_4$ and filtered. The solvents were evaporated under reduced pressure. The residue was purified by flash chromatography over silica gel (dichloromethane-hexanes 1:3 v/v) and a 3.2 g light yellow oil (22 mmol, 31%) was obtained.

Example 28: Sulfur-4-epoxystyrene Copolymerization

Elemental sulfur (500 mg, 1.95 mmol) was added to a 4 mL glass vail equipped with a magnetic stir bar and heated at 130° C. until a clear yellow molten phase was formed. 4-epoxystyrene (500 mg, 3.42 mmol) was injected to liquid sulfur via syringe. The reaction mixture was stirred at 130° C. for 5 h yielding a dark red glass.

Example 3: S-DIB Waveguide Fabrication Processes

Several methods have been developed for forming waveguides in poly (S-r-DIB) and its counterparts. Ultraviolet (UV) light may be used to form the waveguides as follows: (a) Ultraviolet light can be used in conjunction with a light-field mask to expose the polymer in regions surrounding the intended location of the waveguide core, resulting in a reduction in refractive index of more than 0.02 at 1550 nm wavelength; (b) UV light can also be used in conjunction with an appropriate photomask to make the material insoluble in common solvents, thereby enabling the direct creation of physical waveguide structures without the need for expensive etching processes.

Photobleaching in the photobleaching waveguide process the poly (S-r-DIB) is spin-coated onto a suitable lower cladding layer such as $SiO_2$ or the partially fluorinated optical polymer ZPU. The film is then exposed to broadband UV radiation (300-400 nm) through a light-field lithography mask; the regions that are not blocked by mask features experience a reduction in refractive index when the appropriate amount of radiation is delivered.

The detailed process conditions to achieve waveguides with good confinement are as follows: a) dissolve 50/50 S-DIB in dichlorobenzene at 115° C. (1 g/2 mL concentration); b) spin onto $SiO_2$/Si wafers at 3000 RPM for 30 seconds (~1.5 μm film); c) bake at 105° C. for 3 minutes; d) Using a light-field photomask, the films were exposed with a broadband UV source (18 mW/cm$^2$ @ 365 nm) for 4.5 hrs; e) exposed regions show a reduction in the refractive index, such that Δn is about 0.02.

Photocuring

Under different conditions, broadband UV radiation can actually be used to crosslink the poly(S-r-DIB), making it insoluble in its typical solvents. The lithography is then performed using a dark-field lithography mask, such that the exposed regions are crosslinked and remain as rib waveguides when the uncured material is removed with solvent.

A typical procedure is as follows: a) dissolve 50/50 S-DIB in dichlorobenzene at 115° C. (1 g/4 mL concentration); b) spin-coat onto $SiO_2$ (6 μm)/Si wafers at 1.5K/30 secs (~750 nm film); c) bake at 105° C. for 2 min; d) purge the samples in $N_2$ (~30 psi) for 10-15 min; e) using a dark-field photomask, the films are exposed with a broadband UV source (30 mW/cm$^2$ @365 nm) for 10 minutes; the exposed regions are crosslinked and insoluble in the solvent; f) develop in tetrahydrofuran (THF) or chlorobenzene for 20 seconds; g) plasma treatment for 30 seconds; h) spin top cladding layer, ZPU, at 2.5K for 30 sec and then UV cure for 10 min to achieve 3 μm thick top cladding.

Example 4: UV Induced Refractive Index Change

Figure 4:
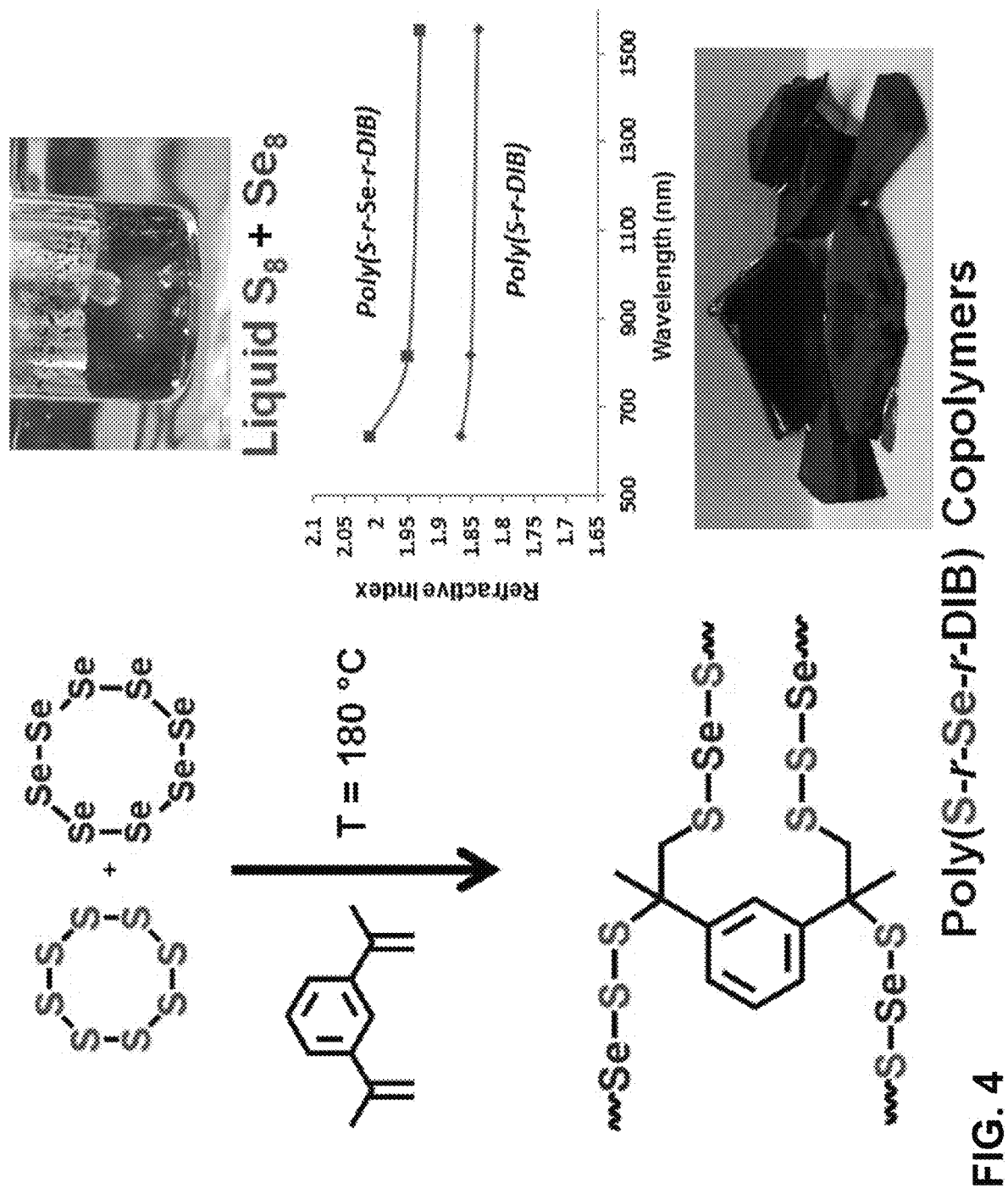
FIG. 4 shows an exemplary reaction schematic of elemental selenium and elemental sulfur polymerizing with comonomers to form chalcogenide-based copolymers with high Se and S content and high refractive index.
Figure 5:
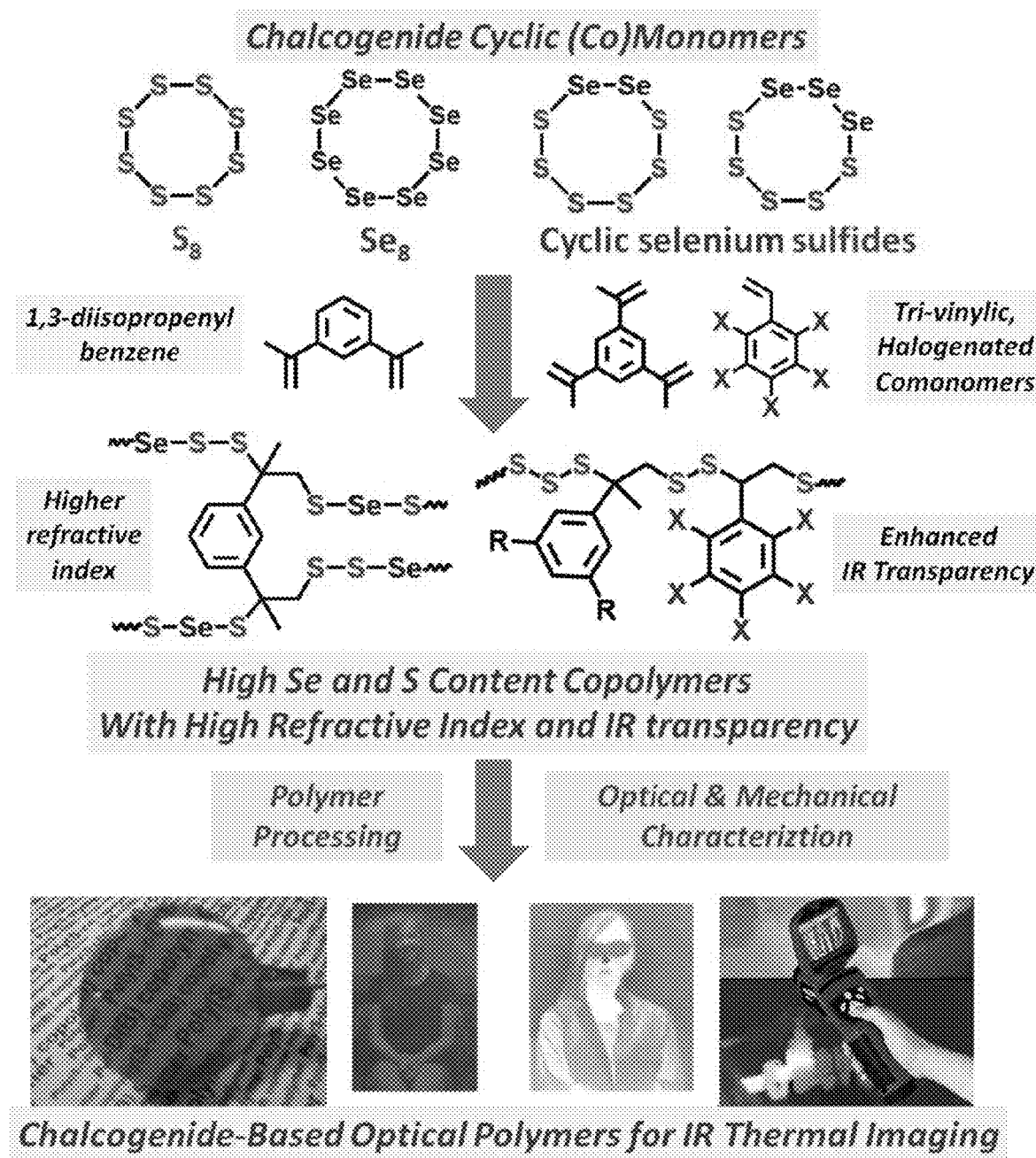
FIG. 5 shows an exemplary reaction schematic of elemental selenium or cyclic selenium sulfides, and elemental sulfur polymerizing with comonomers to form chalcogenide-based copolymers with high Se and S content. Further depicted are exemplary applications of said chalcogenic sulfur copolymers in IR thermal imaging.

The data in FIG. 9 was obtained using the following procedures: Samples C and D were prepared by spinning 50/50 S-DIB on glass slides (1.6 μm thick). Sample C was left unexposed and Sample D was exposed under UV lamp for 4.5 hours. Films were then characterized with a UV-Vis spectrometer. The result is shown in FIG. 4.

The spectra show that there is a feature in the 500 nm region that disappears upon bleaching; the elimination of this feature, which is due to absorption, causes changes in the refractive index, that manifest themselves as shifts in the spectrum in the transparency region (i.e. >700 nm), where the oscillations are due to thin film interference.

Example 5: Waveguide (WG) Fabrication

The data in FIG. 10 was obtained using the following procedures: an optical waveguide (WG) was fabricated in the sulfur-based polymer by using a photomask together with a UV radiation source—the regions exposed to UV defined the side-cladding regions of the waveguide, while the unexposed area between them had higher refractive index. The bottom cladding was silicon dioxide and the top was air.

S-DIB was spun at 2300 rpm/30 sec on a Single Side Polished (SSP) Si wafer with silica cladding. The film then was baked at 100° C. for 3 minutes. The sample was placed under a photomask. Mask had straight WG structures varying in width from 2-7 μm, with 2 sets of each waveguide. The core region of the waveguide structure was covered and the rest of the area was exposed. The sample was kept in the ELC150 UV curing chamber for 5 hours.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

As used herein, the term "about" refers to plus or minus 10% of the referenced number. Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures.

In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

What is claimed is:

1. A sulfur copolymer comprising a copolymerized product of at least about 50 wt % of sulfur monomers derived from elemental sulfur, and about 5-50 wt % of epoxy-functionalized styrenic comonomers having an epoxide moiety and a vinylic moiety, wherein the sulfur monomers copolymerize with both the epoxide and the vinylic moieties to form a crosslinked network of the sulfur copolymer.

2. The sulfur copolymer of claim 1, wherein the epoxy-functionalized styrenic comonomers are 4-vinylbenzyl glycidyl ether or 2-(4-vinylphenyl)oxirane).

3. The sulfur copolymer of claim 1, wherein the sulfur copolymer is a thermoset.

4. The sulfur copolymer of claim 1, wherein a glass transition temperature of the sulfur copolymer is at least about 50° C.

5. The sulfur copolymer of claim 1, wherein the sulfur monomers comprises S—S bonds that, when broken, are configured to be reconnected by thermal reforming.

6. The sulfur copolymer of claim 1, wherein the sulfur copolymer further comprises an elemental carbon material dispersed in the sulfur copolymer at a level in the range of up to about 50 wt % of the sulfur copolymer.

7. The sulfur copolymer of claim 1, further comprising about 5 to 50 wt % of one or more termonomers, wherein the termonomers are selected from a group consisting of a vinyl monomer, an isopropenyl monomer, an acryl monomer, a methacryl monomer, an unsaturated hydrocarbon monomer, an epoxide monomer, a thiirane monomer, an alkynyl monomer, a diene monomer, a butadiene monomer, an isoprene monomer, a norbornene monomer, an amine monomer, a thiol monomer, a sulfide monomer, an alkynylly unsaturated monomer, a nitrone monomer, an aldehyde monomer, a ketone monomer, and an ethylenically unsaturated monomer.

8. A method of synthesizing a sulfur copolymer, comprising:
    a. providing elemental sulfur;
    b. melting the elemental sulfur to form liquid sulfur monomers having reactive sulfur groups;
    c. providing one or more epoxy-functionalized styrenic comonomers, said comonomers having an epoxide moiety and a vinylic moiety; and
    d. adding the comonomers to the liquid sulfur monomers, wherein the reactive sulfur groups of the liquid sulfur monomers copolymerize with the epoxide or vinylic moiety of the epoxy-functionalized styrenic comonomers to form a crosslinked network of the sulfur copolymer.

9. The method of claim 8, wherein at least about 50 wt % of elemental sulfur is provided.

10. The method of claim 8, wherein about 5-50 wt % of epoxy-functionalized styrenic comonomers are provided.

11. The method of claim 8, wherein the epoxy-functionalized styrenic comonomers are 4-vinylbenzyl glycidyl ether or 2-(4-vinylphenyl)oxirane).

12. The method of claim 8, wherein the reactive sulfur groups comprise sulfur radicals and sulfur anionic species.

13. The method of claim 12, wherein the vinylic moiety of the epoxy-functionalized styrenic comonomers reacts with the sulfur radicals via a thiol-ene reaction.

14. The method of claim 12, wherein the epoxide moiety of the epoxy-functionalized styrenic comonomers reacts with the sulfur radicals or sulfur anionic species via ring-opening polymerization.

15. The method of claim 8, wherein the sulfur copolymer is an insoluble thermoset.

16. The method of claim 8, wherein a glass transition temperature of the sulfur copolymer is at least about 50° C.

17. The method of claim 8, further comprising dispersing an elemental carbon material in the sulfur copolymer, wherein the carbon material is at most about 50 wt % of the sulfur copolymer.

18. The method of claim 8, further comprising reacting the sulfur copolymer with one or more termonomers to form a sulfur terpolymer, wherein the termonomers are about 5-50 wt % of the sulfur terpolymer, wherein the termonomers are selected from a group consisting of a vinyl monomer, an isopropenyl monomer, an acryl monomer, a methacryl monomer, an unsaturated hydrocarbon monomer, an epoxide monomer, a thiirane monomer, an alkynyl monomer, a diene monomer, a butadiene monomer, an isoprene monomer, a norbornene monomer, an amine monomer, a thiol monomer, a sulfide monomer, an alkynylly unsaturated monomer, a nitrone monomer, an aldehyde monomer, a ketone monomer, and an ethylenically unsaturated monomer.

\* \* \* \* \*